United States Patent
Uno et al.

(10) Patent No.: US 9,169,414 B2
(45) Date of Patent: Oct. 27, 2015

(54) LIQUID DEVELOPER AND METHOD FOR MANUFACTURING THE SAME

(71) Applicant: Konica Minolta, Inc., Chiyoda-ku (JP)

(72) Inventors: Yukiko Uno, Kyoto (JP); Satoshi Matsumoto, Kyoto (JP); Naoki Yoshie, Ibaraki (JP); Kenji Hayashi, Hachiouji (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 14/030,262

(22) Filed: Sep. 18, 2013

(65) Prior Publication Data

US 2014/0087300 A1    Mar. 27, 2014

(30) Foreign Application Priority Data

Sep. 26, 2012  (JP) ................................. 2012-212412

(51) Int. Cl.
- *G03G 9/13* (2006.01)
- *C09D 11/36* (2014.01)
- *G03G 9/08* (2006.01)
- *C09D 11/00* (2014.01)
- *C09D 5/00* (2006.01)

(52) U.S. Cl.
CPC *C09D 11/36* (2013.01); *C09D 5/00* (2013.01); *C09D 11/00* (2013.01); *G03G 9/0804* (2013.01); *G03G 9/0825* (2013.01); *G03G 9/13* (2013.01); *G03G 9/131* (2013.01); *G03G 9/132* (2013.01)

(58) Field of Classification Search
CPC .......... G03G 9/131; G03G 9/133; G03G 9/13
See application file for complete search history.

(56) References Cited

U.S. PATENT DOCUMENTS

| | | | |
|---|---|---|---|
| 2006/0093954 A1* | 5/2006 | Moudry et al. | 430/115 |
| 2010/0232837 A1* | 9/2010 | Hwang et al. | 399/252 |
| 2011/0281209 A1* | 11/2011 | Sugiura et al. | 430/105 |

FOREIGN PATENT DOCUMENTS

JP    2009-96994 A    5/2009

* cited by examiner

*Primary Examiner* — Hoa V Le

(74) *Attorney, Agent, or Firm* — Buchanan Ingersoll & Rooney PC

(57) ABSTRACT

Toner particles contained in a liquid developer have a core-shell structure that first resin particles containing a first resin are attached to or cover surfaces of second resin particles containing a second resin. The second resin satisfies Equations (1) to (2) below. In Equations (1) to (2) below, x represents a number average molecular weight of the second resin and y represents a urethane group concentration (mass %) in the second resin.

$-0.00003x+2.03 \leq y \leq -0.00003x+6.95$    Equation (1)

$10000 \leq x \leq 50000$    Equation (2)

20 Claims, 2 Drawing Sheets

LIQUID DEVELOPER AND METHOD FOR MANUFACTURING THE SAME

This application is based on Japanese Patent Application No. 2012-212412 filed with the Japan Patent Office on Sep. 26, 2012, the entire content of which is hereby incorporated by reference.

BACKGROUND OF THE INVENTION

1. Field of the Invention

The present invention relates to a liquid developer and a method for manufacturing the same, and suitably to a liquid developer useful for various applications such as a liquid developer for electrophotography, a liquid developer for electrostatic recording, an oil-based ink for ink jet printer, or an ink for electronic paper and a method for manufacturing the same.

2. Description of the Related Art

In using a liquid developer as a liquid developer for electrophotography, a liquid developer for electrostatic recording, an oil-based ink for ink jet printer, an ink for electronic paper, or the like, toner particles dispersed in the liquid developer are transferred together with an insulating solvent and then thermally fixed. Therefore, desirably, the toner particles are sufficiently molten even in such situations that they have been deprived of volatilization heat by the insulating solvent. Among others, from a point of view of energy saving in recent years as well, the toner particles are required to have sharp-melting capability in a low-temperature region.

In order to meet the requirements above, it has been proposed to design a resin to be contained in toner particles by using resin particles having a core-shell structure. For example, according to Japanese Laid-Open Patent Publication No. 2009-96994, by designing a resin to be contained in toner particles by using resin particles having a core-shell structure, a particle size of the resin particles can be controlled and heat-resistant preservation stability of the toner particles is improved.

SUMMARY OF THE INVENTION

With the method described in Japanese Laid-Open Patent Publication No. 2009-96994, since a core layer of the core-shell structure is composed of a resin of low viscosity, fixability of toner particles at a low temperature is improved. If a core layer of the core-shell structure is composed of a resin of too low viscosity, however, the resin is likely to remain on a fixation roller at the time of fixation at a high temperature. What is called hot offset is more likely.

The present invention was made in view of such aspects, and an object thereof is to provide a liquid developer excellent in fixability, which is capable of preventing occurrence of hot offset, and a method for manufacturing the same.

A liquid developer according to the present invention is obtained by dispersing toner particles in an insulating liquid. The toner particles have a core-shell structure that first resin particles containing a first resin are attached to or cover surfaces of second resin particles containing a second resin. The second resin satisfies Equations (1) to (2) below. In Equations (1) to (2) below, x represents a number average molecular weight of the second resin and y represents a urethane group concentration (mass %) in the second resin.

$$-0.00003x + 2.03 \leq y \leq -0.00003x + 6.95 \quad \text{Equation (1)}$$

$$10000 \leq x \leq 50000 \quad \text{Equation (2)}$$

Preferably, the toner particles have a volume average particle size not smaller than 0.01 μm and not greater than 100 μm. Preferably, the toner particles have a coefficient of variation of volume distribution not lower than 1% and not higher than 100%. Preferably, the toner particles have an average value of circularity not smaller than 0.92 and not greater than 1.0. Preferably, in the toner particles, a ratio of surface coverage of the second resin particles with the first resin particles is not lower than 50%.

Preferably, the first resin is at least one of a vinyl resin, a polyester resin, a polyurethane resin, and an epoxy resin. Preferably, the first resin is a vinyl resin, which is a homopolymer or a copolymer containing a bonding unit derived from a vinyl monomer. Preferably, the vinyl monomer is a vinyl monomer having a first molecular chain. Preferably, the vinyl monomer is at least one of a vinyl monomer having a straight-chain hydrocarbon chain having a carbon number from 12 to 27, a vinyl monomer having a branched hydrocarbon chain having a carbon number from 12 to 27, a vinyl monomer having a fluoro-alkyl chain having a carbon number from 4 to 20, and a vinyl monomer having a polydimethylsiloxane chain.

Preferably, the second resin particles contain at least one of a wax and a modified wax obtained by graft polymerization of a vinyl monomer with the wax. Preferably, the second resin particles contain the second resin and a coloring agent.

Preferably, the liquid developer is a paint, a liquid developer for electrophotography, a liquid developer for electrostatic recording, an oil-based ink for ink jet printer, or an ink for electronic paper.

A method for manufacturing a liquid developer according to the present invention includes the steps of preparing a dispersion liquid of first resin particles in which first resin particles containing a first resin are dispersed in an insulating liquid, preparing a solution for forming a second resin, which is obtained by dissolving the second resin or a precursor of the second resin in a first organic solvent, and obtaining toner particles having a core-shell structure that the first resin particles are attached to or cover surfaces of second resin particles containing the second resin, by dispersing the solution for forming the second resin in the dispersion liquid of the first resin particles. The second resin satisfies Equations (1) to (2) below. In Equations (1) to (2), x represents a number average molecular weight of the second resin and y represents a urethane group concentration (mass %) in the second resin.

$$-0.00003x + 2.03 \leq y \leq -0.00003x + 6.95 \quad \text{Equation (1)}$$

$$10000 \leq x \leq 50000 \quad \text{Equation (2)}$$

Preferably, the first organic solvent is distilled out after the step of obtaining toner particles.

Preferably, the first organic solvent has a solubility parameter from 8.5 to 20 $(cal/cm^3)^{1/2}$.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
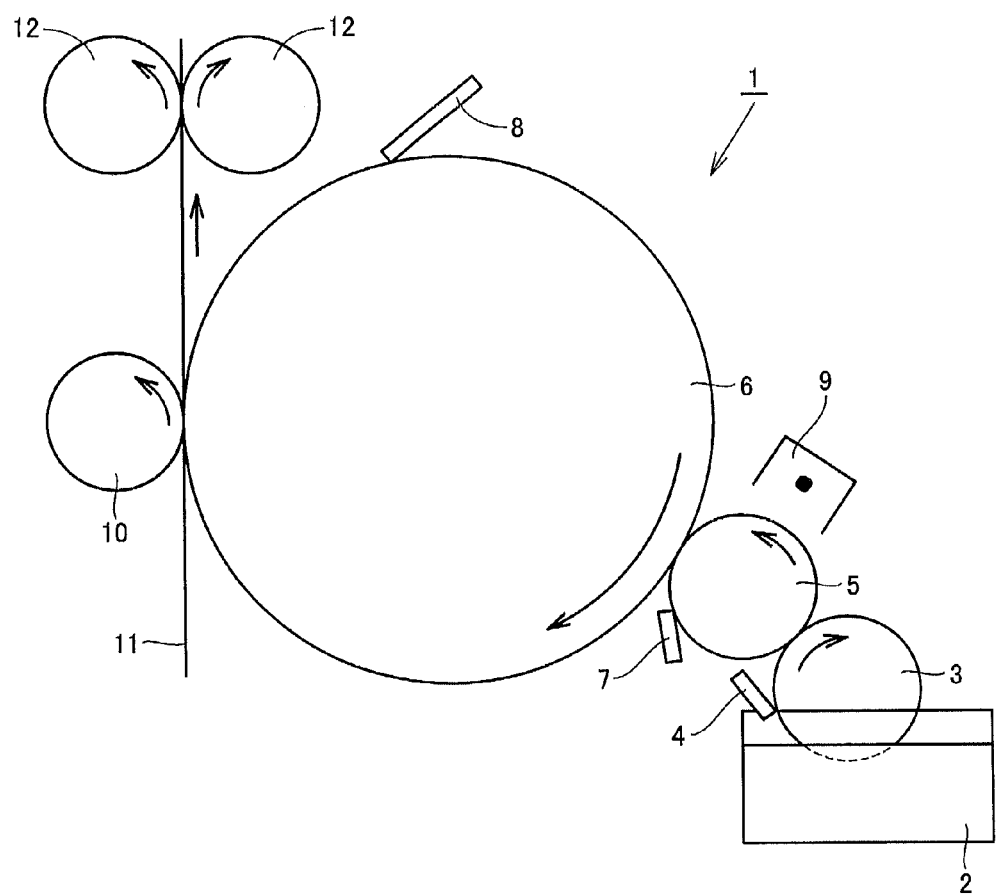
FIG. 1 is a schematic conceptual diagram of an image formation apparatus of an electrophotography type.

A liquid developer according to the present invention will be described below. It is noted that the same reference numerals in the drawings of the present invention refer to the same or corresponding elements. Relation of such a dimension as a length, a width, a thickness, or a depth is modified as appropriate for clarity and brevity of the drawings and does not represent actual dimensional relation.

[Construction of Liquid Developer]

A liquid developer (X) according to the present embodiment is useful as a liquid developer for electrophotography used in an image formation apparatus of an electrophotography type (such as an image formation apparatus shown in FIG. 1) such as a copying machine, a printer, a digital printer, or a simple printer, a paint, a liquid developer for electrostatic recording, an oil-based ink for ink jet printer, or an ink for electronic paper, and it is obtained by dispersing toner particles (C) in an insulating liquid (L). Toner particles (C) have a core-shell structure that first resin particles (A) containing a first resin (a) are attached to or cover surfaces of second resin particles (B) containing a second resin (b). The "first resin (a)" and the "first resin particles (A)" are hereinafter denoted as a "shell resin (a)" and "shell particles (A)", respectively. The "second resin (b)" and the "second resin particles (B)" are denoted as a "core resin (b)" and "core particles (B)", respectively.

<Shell Resin (a)>

The shell resin (a) in the present embodiment may be a thermoplastic resin or a thermosetting resin. The shell resin (a) is preferably, for example, a vinyl resin, a polyester resin, a polyurethane resin, an epoxy resin, a polyamide resin, a polyimide resin, a silicon resin, a phenol resin, a melamine resin, a urea resin, an aniline resin, an ionomer resin, a polycarbonate resin, or the like. Two or more of these may be used together.

From a point of view of ease in obtaining the liquid developer (X) according to the present embodiment, the shell resin (a) is preferably at least one of a vinyl resin, a polyester resin, a polyurethane resin, and an epoxy resin, and more preferably at least one of a polyester resin and a polyurethane resin.

<Vinyl Resin>

The vinyl resin may be a polymer obtained by homopolymerizing a monomer having polymeric double bond (a homopolymer containing a bonding unit derived from a vinyl monomer) or a copolymer obtained by copolymerizing two or more types of monomers having polymeric double bond (a copolymer containing a bonding unit derived from a vinyl monomer). A monomer having polymeric double bond is preferably, for example, (1) to (9) below.

(1) Hydrocarbon Having Polymeric Double Bond

Hydrocarbon having polymeric double bond is preferably, for example, aliphatic hydrocarbon having polymeric double bond shown in (1-1) below, aromatic hydrocarbon having polymeric double bond shown in (1-2) below, or the like.

(1-1) Aliphatic Hydrocarbon Having Polymeric Double Bond

Aliphatic hydrocarbon having polymeric double bond is preferably, for example, chain hydrocarbon having polymeric double bond shown in (1-1-1) below, cyclic hydrocarbon having polymeric double bond shown in (1-1-2) below, or the like.

(1-1-1) Chain Hydrocarbon Having Polymeric Double Bond

Chain hydrocarbon having polymeric double bond is preferably, for example, alkene having a carbon number from 2 to 30 (such as ethylene, propylene, butene, isobutylene, pentene, heptene, diisobutylene, octene, dodecene, or octadecene), alkadiene having a carbon number from 4 to 30 (such as butadiene, isoprene, 1,4-pentadiene, 1,5-hexadiene, or 1,7-octadiene), or the like.

(1-1-2) Cyclic Hydrocarbon Having Polymeric Double Bond

Cyclic hydrocarbon having polymeric double bond is preferably, for example, mono- or di-cycloalkene having a carbon number from 6 to 30 (such as cyclohexene, vinyl cyclohexene, or ethylidene bicycloheptene), mono- or di-cycloalkadiene having a carbon number from 5 to 30 (such as monocyclopentadiene or dicyclopentadiene), or the like.

(1-2) Aromatic Hydrocarbon Having Polymeric Double Bond

Aromatic hydrocarbon having polymeric double bond is preferably, for example, styrene, vinyl naphthalene, or a hydrocarbyl (such as alkyl, cycloalkyl, aralkyl, and/or alkenyl having a carbon number from 1 to 30) substitute of styrene (such as α-methylstyrene, vinyl toluene, 2,4-dimethylstyrene, ethylstyrene, isopropylstyrene, butylstyrene, phenylstyrene, cyclohexylstyrene, benzylstyrene, crotylbenzene, divinyl benzene, divinyl toluene, divinyl xylene, or trivinyl benzene), or the like.

(2) Monomer Having Carboxyl Group and Polymeric Double Bond and Salt Thereof

A monomer having a carboxyl group and polymeric double bond is preferably, for example, unsaturated monocarboxylic acid having a carbon number from 3 to 15 [such as (meth)acrylic acid, crotonic acid, isocrotonic acid, or cinnamic acid], unsaturated dicarboxylic acid (unsaturated dicarboxylic anhydride) having a carbon number from 3 to 30 [such as maleic acid (maleic anhydride), fumaric acid, itaconic acid, citraconic acid (citraconic anhydride), or mesaconic acid], monoalkyl (having a carbon number from 1 to 10) ester of unsaturated dicarboxylic acid having a carbon number from 3 to 10 (such as maleic acid monomethyl ester, maleic acid monodecyl ester, fumaric acid monoethyl ester, itaconic acid monobutyl ester, or citraconic acid monodecyl ester), or the like. "(Meth)acrylic acid" herein means acrylic acid and/or methacrylic acid.

Salt of the monomer above is preferably, for example, alkali metal salt (such as sodium salt or potassium salt), alkaline earth metal salt (such as calcium salt or magnesium salt), ammonium salt, amine salt, quaternary ammonium salt, or the like.

Amine salt is not particularly limited so long as it is an amine compound. Amine salt is preferably, for example, primary amine salt (such as ethylamine salt, butylamine salt, or octylamine salt), secondary amine salt (such as diethylamine salt or dibutylamine salt), tertiary amine salt (such as triethylamine salt or tributylamine salt), or the like.

Quaternary ammonium salt is preferably, for example, tetraethyl ammonium salt, triethyl lauryl ammonium salt, tetrabutyl ammonium salt, tributyl lauryl ammonium salt, or the like.

Salt of the monomer having a carboxyl group and polymeric double bond is preferably, for example, sodium acrylate, sodium methacrylate, monosodium maleate, disodium maleate, potassium acrylate, potassium methacrylate, monopotassium maleate, lithium acrylate, cesium acrylate, ammonium acrylate, calcium acrylate, aluminum acrylate, or the like.

(3) Monomer Having Sulfo Group and Polymeric Double Bond and Salt Thereof

A monomer having a sulfo group and polymeric double bond is preferably, for example, alkene sulfonic acid having a carbon number from 2 to 14 [such as vinyl sulfonic acid, (meth)allyl sulfonic acid, or methyl vinyl sulfonic acid], styrene sulfonic acid, an alkyl (having a carbon number from 2 to 24) derivative of styrene sulfonic acid (such as α-methylstyrene sulfonic acid), sulfo(hydroxy)alkyl-(meth)acrylate having a carbon number from 5 to 18 [such as sulfopropyl(meth) acrylate, 2-hydroxy-3-(meth)acryloxy propylsulfonic acid, 2-(meth)acryloyloxyethane sulfonic acid, or 3-(meth)acryloyloxy-2-hydroxypropane sulfonic acid], sulfo(hydroxy) alkyl(meth)acrylamide having a carbon number from 5 to 18 [such as 2-(meth)acryloylamino-2,2-dimethylethane sulfonic acid, 2-(meth)acrylamide-2-methylpropane sulfonic acid, or 3-(meth)acrylamide-2-hydroxypropane sulfonic acid], alkyl (having a carbon number from 3 to 18) allylsulfo succinic acid (such as propylallylsulfo succinic acid, butylallylsulfo succinic acid, or 2-ethylhexyl-allylsulfo succinic acid), poly-[n ("n" representing a degree of polymerization; to be understood similarly hereinafter)=2 to 30] oxyalkylene (such as oxyethylene, oxypropylene, or oxybutylene; polyoxyalkylene may be a homopolymer of oxyalkylene or a copolymer of oxyalkylene; if polyoxyalkylene is a copolymer of oxyalkylene, it may be a random polymer or a block polymer), sulfate ester of mono(meth)acrylate [such as sulfate ester of poly-(n=5 to 15) oxyethylene monomethacrylate or sulfate ester of poly-(n=5 to 15) oxypropylene monomethacrylate], a compound expressed with Chemical Formulae (1) to (3) below, or the like.

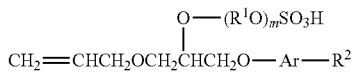

Chemical Formula (1)

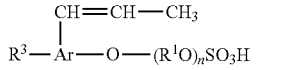

Chemical Formula (2)

Chemical Formula (3)

In Chemical Formulae (1) to (3) above, $R^1$ represents an alkylene group having a carbon number from 2 to 4. When Chemical Formula (1) includes two or more $R^1$Os, two or more $R^1$Os may be composed of the same alkylene group or of two or more types of alkylene groups as combined. When two or more types of alkylene groups are used as combined, a sequence of $R^1$ in Chemical Formula (1) may be a random sequence or a block sequence. $R^2$ and $R^3$ each independently represent an alkyl group having a carbon number from 1 to 15. m and n are each independently an integer from 1 to 50. Ar represents a benzene ring. $R^4$ represents an alkyl group having a carbon number from 1 to 15, which may be substituted with a fluorine atom.

Salt of a monomer having a sulfo group and polymeric double bond is preferably, for example, salts listed as the "salt of the monomer above" in "(2) Monomer Having Carboxyl Group and Polymeric Double Bond" above.

(4) Monomer Having Phosphono Group and Polymeric Double Bond and Salt Thereof

A monomer having a phosphono group and polymeric double bond is preferably, for example, (meth)acryloyloxy alkyl phosphate monoester (a carbon number of an alkyl group being from 1 to 24) [such as 2-hydroxyethyl(meth) acryloyl phosphate or phenyl-2-acryloyloxy ethyl phosphate], (meth)acryloyloxy alkyl phosphonic acid (a carbon number of an alkyl group being from 1 to 24) (such as 2-acryloyloxy ethyl phosphonic acid), or the like.

Salt of the monomer having a phosphono group and polymeric double bond is preferably, for example, salts listed as the "salt of the monomer above" in "(2) Monomer Having Carboxyl Group and Polymeric Double Bond" above.

(5) Monomer Having Hydroxyl Group and Polymeric Double Bond

A monomer having a hydroxyl group and polymeric double bond is preferably, for example, hydroxystyrene, N-methylol(meth)acrylamide, hydroxyethyl(meth)acrylate, hydroxypropyl(meth)acrylate, polyethylene glycol mono (meth)acrylate, (meth)allyl alcohol, crotyl alcohol, isocrotyl alcohol, 1-butene-3-ol, 2-butene-1-ol, 2-butene-1,4-diol, propargyl alcohol, 2-hydroxyethyl propenyl ether, sucrose allyl ether, or the like.

(6) Nitrogen-Containing Monomer Having Polymeric Double Bond

A nitrogen-containing monomer having polymeric double bond is preferably, for example, a monomer shown in (6-1) to (6-4) below.

(6-1) Monomer Having Amino Group and Polymeric Double Bond

A monomer having an amino group and polymeric double bond is preferably, for example, aminoethyl(meth)acrylate, dimethylaminoethyl(meth)acrylate, diethylaminoethyl (meth)acrylate, t-butylaminoethyl methacrylate, N-aminoethyl(meth)acrylamide, (meth)allyl amine, morpholinoethyl (meth)acrylate, 4-vinylpyridine, 2-vinylpyridine, crotyl amine, N,N-dimethylamino styrene, methyl-α-acetamino acrylate, vinylimidazole, N-vinylpyrrole, N-vinyl thiopyrrolidone, N-aryl phenylenediamine, aminocarbazole, aminothiazole, aminoindole, aminopyrrole, aminoimidazole, aminomercaptothiazole, or the like.

The monomer having an amino group and polymeric double bond may be the salts of the monomer listed above. The salts of the monomer listed above are preferably, for example, salts listed as the "salt of the monomer above" in "(2) Monomer Having Carboxyl Group and Polymeric Double Bond" above.

(6-2) Monomer Having Amide Group and Polymeric Double Bond

A monomer having an amide group and polymeric double bond is preferably, for example, (meth)acrylamide, N-methyl (meth)acrylamide, N-butyl acrylamide, diacetone acrylamide, N-methylol(meth)acrylamide, N,N'-methylene-bis (meth)acrylamide, cinnamic acid amide, N,N-dimethylacrylamide, N,N-dibenzylacrylamide, methacrylformamide, N-methyl-N-vinylacetamide, N-vinylpyrrolidone, or the like.

(6-3) Monomer Having Carbon Number from 3 to 10 and Having Nitrile Group and Polymeric Double Bond A monomer having a carbon number from 3 to 10 and having a nitrile group and polymeric double bond is preferably, for example, (meth)acrylonitrile, cyanostyrene, cyanoacrylate, or the like.

(6-4) Monomer Having Carbon Number from 8 to 12 and Having Nitro Group and Polymeric Double Bond A monomer having a carbon number from 8 to 12 and having a nitro group and polymeric double bond is preferably, for example, nitrostyrene or the like.

(7) Monomer Having Carbon Number from 6 to 18 and Having Epoxy Group and Polymeric Double Bond A monomer having a carbon number from 6 to 18 and having an epoxy group and polymeric double bond is preferably, for example, glycidyl(meth)acrylate or the like.

(8) Monomer Having Carbon Number from 2 to 16 and Having Halogen Element and Polymeric Double Bond A monomer having a carbon number from 2 to 16 and having a halogen element and polymeric double bond is preferably, for example, vinyl chloride, vinyl bromide, vinylidene chloride, allyl chloride, chlorostyrene, bromostyrene, dichlorostyrene, chloromethylstyrene, tetrafluorostyrene, chloroprene, or the like.

(9) Others

Other than the monomers above, a monomer having polymeric double bond is preferably a monomer shown in (9-1) to (9-4) below.

(9-1) Ester Having Carbon Number from 4 to 16 and Having Polymeric Double Bond

An ester having a carbon number from 4 to 16 and having polymeric double bond is preferably, for example, vinyl acetate, vinyl propionate, vinyl butyrate, diallyl phthalate, diallyl adipate, isopropenyl acetate, vinyl methacrylate, methyl-4-vinyl benzoate, cyclohexyl methacrylate, benzyl methacrylate, phenyl(meth)acrylate, vinyl methoxy acetate, vinyl benzoate, ethyl-α-ethoxy acrylate, alkyl(meth)acrylate having an alkyl group having a carbon number from 1 to 11 [such as methyl(meth)acrylate, ethyl(meth)acrylate, propyl (meth)acrylate, butyl(meth)acrylate, or 2-ethylhexyl(meth) acrylate], dialkyl fumarate (two alkyl groups being straight-chain alkyl groups, branched alkyl groups, or alicyclic alkyl groups, having a carbon number from 2 to 8), dialkyl maleate (two alkyl groups being straight-chain alkyl groups, branched alkyl groups, or alicyclic alkyl groups, having a carbon number from 2 to 8), poly(meth)allyloxy alkanes (such as diallyloxyethane, triallyloxyethane, tetraallyloxyethane, tetraallyloxypropane, tetraallyloxybutane, or tetramethallyloxyethane), a monomer having a polyalkylene glycol chain and polymeric double bond [such as polyethylene glycol (Mn=300) mono(meth)acrylate, polypropylene glycol (Mn=500) monoacrylate, a 10-mole adduct (meth) acrylate of ethylene oxide (hereinafter "ethylene oxide" being abbreviated as "EO") to methyl alcohol or a 30-mole adduct (meth)acrylate of EO to lauryl alcohol (meth)acrylate], poly(meth)acrylates {such as poly(meth)acrylate of polyhydric alcohols [such as ethylene glycol di(meth)acrylate, propylene glycol di(meth)acrylate, neopentyl glycol di(meth)acrylate, trimethylol propane tri(meth)acrylate, or polyethylene glycol di(meth)acrylate]}, or the like.

(9-2) Ether Having Carbon Number from 3 to 16 and Having Polymeric Double Bond

Ether having a carbon number from 3 to 16 and having polymeric double bond is preferably, for example, vinyl methyl ether, vinyl ethyl ether, vinyl propyl ether, vinyl butyl ether, vinyl-2-ethyl hexyl ether, vinyl phenyl ether, vinyl-2-methoxy ethyl ether, methoxy butadiene, vinyl-2-butoxyethyl ether, 3,4-dihydro-1,2-pyran, 2-butoxy-2'-vinyloxy diethyl ether, acetoxystyrene, phenoxystyrene, or the like.

(9-3) Ketone Having Carbon Number from 4 to 12 and Having Polymeric Double Bond

Ketone having a carbon number from 4 to 12 and having polymeric double bond is preferably, for example, vinyl methyl ketone, vinyl ethyl ketone, vinyl phenyl ketone, or the like.

(9-4) Sulfur Containing Compound Having Carbon Number from 2 to 16 and Having Polymeric Double Bond A sulfur containing compound having a carbon number from 2 to 16 and having polymeric double bond is preferably, for example, divinyl sulfide, p-vinyl diphenyl sulfide, vinyl ethyl sulfide, vinyl ethyl sulfone, divinyl sulfone, divinylsulfoxide, or the like.

A specific example of a vinyl resin is preferably, for example, a styrene-(meth)acrylic acid ester copolymer, a styrene-butadiene copolymer, a (meth)acrylic acid-(meth) acrylic acid ester copolymer, a styrene-acrylonitrile copolymer, a styrene-maleic acid (maleic anhydride) copolymer, a styrene-(meth)acrylic acid copolymer, a styrene-(meth) acrylic acid-divinylbenzene copolymer, a styrene-styrene sulfonic acid-(meth)acrylic acid ester copolymer, or the like.

The vinyl resin may be a homopolymer or a copolymer of a monomer having polymeric double bond in (1) to (9) above, or it may be a polymerized product of a monomer having polymeric double bond in (1) to (9) above and a monomer (m) having a first molecular chain (k) and having polymeric double bond. The first molecular chain (k) is preferably, for example, a straight-chain or branched hydrocarbon chain having a carbon number from 12 to 27, a fluoro-alkyl chain having a carbon number from 4 to 20, a polydimethylsiloxane chain, or the like. A difference in SP value between the first molecular chain (k) in the monomer (m) and the insulating liquid (L) is preferably 2 or smaller. The "SP value" herein is a numeric value calculated with a Fedors' method [Polym. Eng. Sci. 14(2) 152, (1974)].

Though the monomer (m) having the first molecular chain (k) and polymeric double bond is not particularly limited, it is preferably, for example, monomers (m1) to (m4) below. Two or more of the monomers (m1) to (m4) may be used together.

Monomer (m1) Having Straight-Chain Hydrocarbon Chain Having Carbon Number From 12 to 27 (Preferably From 16 to 25) and Polymeric Double Bond Such a monomer (m1) is preferably, for example, mono-straight-chain alkyl (a carbon number of alkyl being from 12 to 27) ester of unsaturated monocarboxylic acid, mono-straight-chain alkyl (a carbon number of alkyl being from 12 to 27) ester of unsaturated dicarboxylic acid, or the like. The monomer (m1) is more preferably, for example, a carboxyl group containing vinyl monomer having a carbon number from 3 to 24 such as (meth)acrylic acid, maleic acid, fumaric acid, crotonic acid, itaconic acid, or citraconic acid, or the like. A specific example of the monomer (m1) is, for example, dodecyl(meth)acrylate, stearyl(meth)acrylate, behenyl (meth)acrylate, hexadecyl(meth)acrylate, heptadecyl(meth) acrylate, eicosyl(meth)acrylate, or the like.

Monomer (m2) Having Branched Hydrocarbon Chain Having Carbon Number from 12 to 27 (Preferably from 16 to 25) and Polymeric Double Bond Such a monomer (m2) is preferably, for example, branched alkyl (a carbon number of alkyl being from 12 to 27) ester of unsaturated monocarboxylic acid, mono-branched alkyl (a carbon number of alkyl being from 12 to 27) ester of unsaturated dicarboxylic acid, or the like. Unsaturated monocarboxylic acid and unsaturated dicarboxylic acid are preferably, for example, as listed as specific examples of unsaturated monocarboxylic acid and unsaturated dicarboxylic acid with regard to the monomer (m1). A specific example of the monomer (m2) is, for example, 2-decyltetradecyl(meth)acrylate or the like.

Monomer (m3) Having Fluoro-Alkyl Chain Having Carbon Number from 4 to 20 and Polymeric Double Bond Such a monomer (m3) is preferably, for example, perfluoroalkyl(alkyl)(meth)acrylic acid ester or the like expressed with a Chemical Formula (4) below.

$$CH_2=CR-COO-(CH_2)_p-(CF_3)_q-Z \qquad \text{Chemical Formula (4)}$$

In Chemical Formula (4) above, R represents a hydrogen atom or a methyl group, p represents an integer from 0 to 3, q represents any of 2, 4, 6, 8, 10, and 12, and Z represents a hydrogen atom or a fluorine atom. A specific example of the monomer (m3) is preferably, for example, [(2-perfluoroethyl) ethyl](meth)acrylic acid ester, [(2-perfluorobutyl)ethyl] (meth)acrylic acid ester, [(2-perfluorohexyl)ethyl](meth) acrylic acid ester, [(2-perfluorooctyl)ethyl](meth)acrylic acid ester, [(2-perfluorodecyl)ethyl](meth)acrylic acid ester, [(2-perfluorododecyl)ethyl](meth)acrylic acid ester, or the like.

Monomer (m4) Having Polydimethylsiloxane Chain and Polymeric Double Bond

Such a monomer (m4) is preferably, for example, (meth) acrylic modified silicone or the like expressed with a Chemical Formula (5) below.

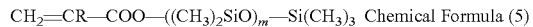

$CH_2=CR-COO-((CH_3)_2SiO)_m-Si(CH_3)_3$  Chemical Formula (5)

In Chemical Formula (5) above, R represents a hydrogen atom or a methyl group and m is from 15 to 45 on average. A specific example of the monomer (m4) is preferably, for example, modified silicone oil (such as "X-22-174DX", "X-22-2426", or "X-22-2475" manufactured by Shin-Etsu Chemical Co., Ltd.) or the like.

Among the monomers (m1) to (m4), a preferred monomer is the monomer (m1) or the monomer (m2) and a more preferred monomer is the monomer (m2).

A content of the monomer (m) is preferably from 10 to 90 mass %, more preferably from 15 to 80 mass %, and further preferably from 20 to 60 mass %, with respect to a mass of the vinyl resin. So long as the content of the monomer (m) is within the range above, toner particles are less likely to unite with each other.

In a case where a monomer having polymeric double bond in (1) to (9) above, the monomer (m1), and the monomer (m2) are polymerized to make up a vinyl resin, from a point of view of particle size distribution of toner particles and fixability of the toner particles, a mass ratio between the monomer (m1) and the monomer (m2) [(m1):(m2)] is preferably from 90:10 to 10:90, more preferably from 80:20 to 20:80, and further preferably from 70:30 to 30:70.

<Polyester Resin>

A polyester resin is preferably, for example, a polycondensed product or the like of polyol and polycarboxylic acid, acid anhydride of polycarboxylic acid, or lower alkyl (a carbon number of an alkyl group being from 1 to 4) ester of polycarboxylic acid. A known polycondensation catalyst or the like can be used for polycondensation reaction.

Polyol is preferably, for example, diol (10), polyol (11) having valence not smaller than 3 (hereinafter abbreviated as "polyol (11)"), or the like.

Polycarboxylic acid is preferably, for example, dicarboxylic acid (12), polycarboxylic acid (13) having valence not smaller than 3 (hereinafter abbreviated as "polycarboxylic acid (13)"), or the like. Acid anhydride of polycarboxylic acid is preferably, for example, acid anhydride of dicarboxylic acid (12), acid anhydride of polycarboxylic acid (13), or the like. Lower alkyl ester of polycarboxylic acid is preferably, for example, lower alkyl ester of dicarboxylic acid (12), lower alkyl ester of polycarboxylic acid (13), or the like.

A ratio between polyol and polycarboxylic acid is not particularly limited. A ratio between polyol and polycarboxylic acid should only be set such that an equivalent ratio between a hydroxyl group [OH] and a carboxyl group [COOH] ([OH]/[COOH]) is set preferably to 2/1 to 1/5, more preferably to 1.5/1 to 1/4, and further preferably to 1.3/1 to 1/3.

Diol (10) is preferably, for example, alkylene glycol having a carbon number from 2 to 30 (such as ethylene glycol, 1,2-propylene glycol, 1,3-propylene glycol, 1,4-butanediol, 1,6-hexanediol, octanediol, decanediol, dodecanediol, tetradecanediol, neopentylglycol, or 2,2-diethyl-1,3-propanediol), alkylene ether glycol having Mn=106 to 10000 (such as diethylene glycol, triethylene glycol, dipropylene glycol, polyethylene glycol, polypropylene glycol, or polytetramethylene ether glycol), alicyclic diol having a carbon number from 6 to 24 (such as 1,4-cyclohexanedimethanol or hydrogenated bisphenol A), an adduct (the number of added moles being from 2 to 100) of alkylene oxide (hereinafter "alkylene oxide" being abbreviated as "AO") to alicyclic diol above having Mn=100 to 10000 (such as a 10-mole adduct of EO to 1,4-cyclohexanedimethanol), an adduct (the number of added moles being from 2 to 100) of AO [such as EO, propylene oxide (hereinafter abbreviated as "PO"), or butylene oxide] to bisphenols having a carbon number from 15 to 30 (such as bisphenol A, bisphenol F, or bisphenol S), an adduct of AO to polyphenol having a carbon number from 12 to 24 (such as catechol, hydroquinone, or resorcin) (such as a 2 to 4-mole adduct of EO to bisphenol A or a 2 to 4-mole adduct of PO to bisphenol A), polylactonediol having a weight average molecular weight (hereinafter abbreviated as "Mw")=100 to 5000 (such as poly-ε-caprolactonediol), polybutadienediol having Mw=1000 to 20000, or the like.

Among these, as diol (10), alkylene glycol or an adduct of AO to bisphenols is preferred and an adduct alone of AO to bisphenols or a mixture of an adduct of AO to bisphenols and alkylene glycol is more preferred.

Polyol (11) is preferably, for example, aliphatic polyhydric alcohol having valence not smaller than 3 and having a carbon number from 3 to 10 (such as glycerol, trimethylolethane, trimethylolpropane, pentaerythritol, sorbitan, or sorbitol), an adduct (the number of added moles being from 2 to 100) of AO (having a carbon number from 2 to 4) to trisphenol having a carbon number from 25 to 50 (such as a 2 to 4-mole adduct of EO to trisphenol or a 2 to 4-mole adduct of PO to trisphenol polyamide), an adduct (the number of added moles being from 2 to 100) of AO (having a carbon number from 2 to 4) to a novolac resin (such as phenol novolac or cresol novolac) having n=3 to 50 (such as a 2-mole adduct of PO to phenol novolac or a 4-mole adduct of EO to phenol novolac), an adduct (the number of added moles being from 2 to 100) of AO (having a carbon number from 2 to 4) to polyphenol having a carbon number from 6 to 30 (such as pyrogallol, phloroglucinol, or 1,2,4-benzenetriol) (such as a 4-mole adduct of EO to pyrogallol), acrylic polyol having n=20 to 2000 {such as a copolymer of hydroxyethyl(meth)acrylate and a monomer having other polymeric double bond [such as styrene, (meth)acrylic acid, or (meth)acrylic acid ester]}, or the like.

Among these, as polyol (11), aliphatic polyhydric alcohol or an adduct of AO to a novolac resin is preferred, and an adduct of AO to a novolac resin is more preferred.

Dicarboxylic acid (12) is preferably, for example, alkane dicarboxylic acid having a carbon number from 4 to 32 (such as succinic acid, adipic acid, sebacic acid, azelaic acid, dodecane dicarboxylic acid, or octadecane dicarboxylic acid), alkene dicarboxylic acid having a carbon number from 4 to 32 (such as maleic acid, fumaric acid, citraconic acid, or mesaconic acid), branched alkene dicarboxylic acid having a carbon number from 8 to 40 [such as dimer acid or alkenyl succinic acid (such as dodecenyl succinic acid, pentadecenyl succinic acid, or octadecenyl succinic acid)], branched alkane dicarboxylic acid having a carbon number from 12 to 40 [such as alkyl succinic acid (such as decyl succinic acid, dodecyl succinic acid, or octadecyl succinic acid)], aromatic dicarboxylic acid having a carbon number from 8 to 20 (such as phthalic acid, isophthalic acid, terephthalic acid, or naphthalene dicarboxylic acid), or the like.

Among these, as dicarboxylic acid (12), alkene dicarboxylic acid or aromatic dicarboxylic acid is preferred, and aromatic dicarboxylic acid is more preferred.

Polycarboxylic acid (13) is preferably, for example, aromatic polycarboxylic acid having a carbon number from 9 to 20 (such as trimellitic acid or pyromellitic acid) or the like.

The acid anhydride above is preferably, for example, trimellitic anhydride, pyromellitic anhydride, or the like. The lower alkyl ester above is preferably, for example, methyl ester, ethyl ester, isopropyl ester, or the like.

<Polyurethane Resin>

A polyurethane resin is preferably, for example, a polyadduct of polyisocyanate (14) and an active hydrogen containing compound {for example, at least one of water, polyol [such as diol (10) (including diol having a functional group other than a hydroxyl group) or polyol (11)], polycarboxylic acid [such as dicarboxylic acid (12) or polycarboxylic acid (13)], polyester polyol obtained by polycondensation between polyol and polycarboxylic acid, a ring-opening polymer of lactone having a carbon number from 6 to 12, polyamine (15), and polythiol (16)}. A polyurethane resin may be, for example, an amino group containing polyurethane resin or the like, obtained by causing a terminal isocyanate group prepolymer resulting from reaction between polyisocyanate (14) and the active hydrogen containing compound above to react with primary and/or secondary monoamine(s) (17) in parts equal to an isocyanate group of the terminal isocyanate group prepolymer. A content of a carboxyl group in the polyurethane resin is preferably from 0.1 to 10 mass %.

Polyisocyanate (14) is preferably, for example: aromatic polyisocyanate having a carbon number from 6 to 20 (except for carbon in an NCO group; hereinafter to be similarly understood in <Polyurethane Resin>) or aliphatic polyisocyanate having a carbon number from 2 to 18, a modified product of these polyisocyanates (such as a modified product including a urethane group, a carbodiimide group, an allophanate group, a urea group, a biuret group, a uretdione group, a uretonimine group, an isocyanurate group, an oxazolidone group, or the like), or the like. Two or more of these may be used together.

Aromatic polyisocyanate is preferably, for example, 1,3- or 1,4-phenylene diisocyanate, 2,4- or 2,6-tolylene diisocyanate (hereinafter abbreviated as "TDI"), crude TDI, m- or p-xylylene diisocyanate, α,α,α',α'-tetramethylxylylene diisocyanate, 2,4'- or 4,4'-diphenylmethane diisocyanate (hereinafter abbreviated as "MDI"), crude MDI {such as a phosgenated product of crude diaminophenylmethane [such as a condensed product of formaldehyde and aromatic amine (one type may be used or two or more types may be used together) or a mixture of diaminodiphenylmethane and a small amount (for example, 5 to 20 mass %) of polyamine having three or more amine groups] or polyallyl polyisocyanate}, 1,5-naphthylene diisocyanate, 4,4',4"-triphenylmethane triisocyanate, m- or p-isocyanatophenylsulfonyl isocyanate, or the like, Two or more of these may be used together.

Aliphatic polyisocyanate is preferably, for example, chain aliphatic polyisocyanate, cyclic aliphatic polyisocyanate, or the like.

Chain aliphatic polyisocyanate is preferably, for example, ethylene diisocyanate, tetramethylene diisocyanate, hexamethylene diisocyanate (hereinafter abbreviated as "HDI"), dodecamethylene diisocyanate, 1,6,11-undecane triisocyanate, 2,2,4-trimethyl hexamethylene diisocyanate, lysine diisocyanate, 2,6-diisocyanatomethyl caproate, bis(2-isocyanatoethyl)fumarate, bis(2-isocyanatoethyl)carbonate, 2-isocyanatoethyl-2,6-diisocyanatohexanoate, or the like. Two or more of these may be used together.

Cyclic aliphatic polyisocyanate is preferably, for example, isophoron diisocyanate (hereinafter abbreviated as "IPDI"), dicyclohexylmethane-4,4'-diisocyanate (hydrogenated MDI), cyclohexylene diisocyanate, methylcyclohexylene diisocyanate (hydrogenated TDI), bis(2-isocyanatoethyl)-4-cyclohexene-1,2-dicarboxylate, 2,5- or 2,6-norbornane diisocyanate, or the like. Two or more of these may be used together.

A modified product of polyisocyanate is preferably, for example, a polyisocyanate compound including at least one of a urethane group, a carbodiimide group, an allophanate group, a urea group, a biuret group, a uretdione group, a uretonimine group, an isocyanurate group, and an oxazolidone group, or the like. The modified product of polyisocyanate is preferably, for example, modified MDI (such as urethane-modified MDI, carbodiimide-modified MDI, or trihydrocarbyl-phosphate-modified MDI), urethane-modified TDI, use of two or more types of these [such as use of modified MDI and urethane-modified TDI (such as an isocyanate containing prepolymer) as combined], or the like.

Among these, as polyisocyanate (14), aromatic polyisocyanate having a carbon number from 6 to 15 or aliphatic polyisocyanate having a carbon number from 4 to 15 is preferred. TDI, MDI, HDI, hydrogenated MDI, or IPDI is more preferred.

Polyamine (15) is preferably, for example, aliphatic polyamine having a carbon number from 2 to 18, aromatic polyamine (having a carbon number, for example, from 6 to 20), or the like.

Aliphatic polyamine having a carbon number from 2 to 18 is preferably, for example, chain aliphatic polyamine, an alkyl (having a carbon number from 1 to 4) substitute of chain aliphatic polyamine, a hydroxyalkyl (having a carbon number from 2 to 4) substitute of chain aliphatic polyamine, cyclic aliphatic polyamine, or the like.

Chain aliphatic polyamine is preferably, for example, alkylene diamine having a carbon number from 2 to 12 (such as ethylene diamine, propylene diamine, trimethylene diamine, tetramethylene diamine, or hexamethylene diamine), polyalkylene (having a carbon number from 2 to 6) polyamine [such as diethylene triamine, iminobispropylamine, bis(hexamethylene)triamine, triethylenetetramine, tetraethylenepentamine, or pentaethylenehexamine], or the like.

The alkyl (having a carbon number from 1 to 4) substitute of chain aliphatic polyamine or the hydroxyalkyl (having a carbon number from 2 to 4) substitute of chain aliphatic polyamine is preferably, for example, dialkyl (having a carbon number from 1 to 3) aminopropyl amine, trimethyl hexamethylene diamine, aminoethyl ethanol amine, 2,5-dimethyl-2,5-hexamethylene diamine, methyliminobispropylamine, or the like.

Cyclic aliphatic polyamine is preferably, for example, alicyclic polyamine having a carbon number from 4 to 15 [such as 1,3-diaminocyclohexane, isophoron diamine, menthene diamine, 4,4'-methylene dicyclohexane diamine (hydrogenated methylenedianiline), or 3,9-bis(3-aminopropyl)-2,4,8,10-tetraoxaspiro[5,5]undecane], heterocyclic polyamine having a carbon number from 4 to 15 [such as piperazine, N-aminoethylpiperazine, 1,4-diaminoethylpiperazine, or 1,4-bis(2-amino-2-methylpropyl)piperazine], or the like.

Aromatic polyamine (having a carbon number from 6 to 20) is preferably, for example, non-substituted aromatic polyamine, aromatic polyamine having an alkyl group (for example, an alkyl group having a carbon number from 1 to 4, such as a methyl group, an ethyl group, an n-propyl group, an isopropyl group, or a butyl group), aromatic polyamine having an electron-withdrawing group (such as halogen atoms such as Cl, Br, I, or F, an alkoxy group such as a methoxy group or an ethoxy group, or a nitro group), aromatic polyamine having a secondary amino group, or the like.

Non-substituted aromatic polyamine is preferably, for example, 1,2-, 1,3-, or 1,4-phenylene diamine, 2,4'- or 4,4'-diphenyl methane diamine, crude diphenyl methane diamine (such as polyphenyl polymethylene polyamine), diaminodiphenyl sulfone, benzidine, thiodianiline, bis(3,4-diaminophenyl)sulfone, 2,6-diaminopyridine, m-aminobenzyl amine, triphenylmethane-4,4',4"-triamine, naphthylene diamine, or the like. Two or more of these may be used together.

Aromatic polyamine having an alkyl group (for example, an alkyl group having a carbon number from 1 to 4, such as a methyl group, an ethyl group, an n-propyl group, an isopropyl group, or a butyl group) is preferably, for example, 2,4- or 2,6-tolylene diamine, crude tolylene diamine, diethyl tolylene diamine, 4,4'-diamino-3,3'-dimethyldiphenylmethane, 4,4'-bis(o-toluidine), dianisidine, diaminoditolyl sulfone, 1,3-dimethyl-2,4-diaminobenzene, 1,3-diethyl-2,4-diaminobenzene, 1,3-dimethyl-2,6-diaminobenzene, 1,4-diethyl-2,5-diamino benzene, 1,4-diisopropyl-2,5-diaminobenzene, 1,4-dibutyl-2,5-diaminobenzene, 2,4-diaminomesitylene, 1,3,5-triethyl-2,4-di aminobenzene, 1,3,5-triisopropyl-2,4-diaminobenzene, 1-methyl-3,5-diethyl-2,4-diaminobenzene, 1-methyl-3,5-diethyl-2,6-diaminobenzene, 2,3-dimethyl-1,4-diaminonaphthalene, 2,6-dimethyl-1,5-diaminonaphthalene, 2,6-diisopropyl-1,5-diaminonaphthalene, 2,6-dibutyl-1,5-diaminonaphthalene, 3,3',5,5'-tetramethylbenzidine, 3,3',5,5'-tetraisopropylbenzidine, 3,3',5,5'-tetramethyl-4,4'-diaminodiphenylmethane, 3,3',5,5'-tetraethyl-4,4'-diaminodiphenylmethane, 3,3',5,5'-tetraisopropyl-4,4'-diaminodiphenylmethane, 3,3',5,5'-tetrabutyl-4,4'-diaminodiphenylmethane, 3,5-diethyl-3'-methyl-2',4-diaminodiphenylmethane, 3,5-diisopropyl-3'-methyl-2',4-diaminodiphenylmethane, 3,3'-diethyl-2,2'-diaminodiphenylmethane, 4,4'-diamino-3,3'-dimethyldiphenylmethane, 3,3',5,5'-tetraethyl-4,4'-diaminobenzophenone, 3,3',5,5'-tetraisopropyl-4,4'-diaminobenzophenone, 3,3',5,5'-tetraethyl-4,4'-diaminodiphenyl ether, 3,3',5,5'-tetraisopropyl-4,4'-diaminodiphenyl sulfone, or the like. Two or more of these may be used together.

Aromatic polyamine having an electron-withdrawing group (such as halogen atoms such as Cl, Br, I, or F, an alkoxy group such as a methoxy group or an ethoxy group, or a nitro group) is preferably, for example: methylenebis-o-chloroaniline, 4-chloro-o-phenylenediamine, 2-chloro-1,4-phenylenediamine, 3-amino-4-chloroaniline, 4-bromo-1,3-phenylenediamine, 2,5-dichloro-1,4-phenylenediamine, 5-nitro-1,3-phenylenediamine, 3-dimethoxy-4-aminoaniline, 4,4'-diamino-3,3'-dimethyl-5,5'-dibromo-diphenylmethane, 3,3'-dichlorobenzidine, 3,3'-dimethoxybenzidine, bis(4-amino-3-chlorophenyl)oxide, bis(4-amino-2-chlorophenyl)propane, bis(4-amino-2-chlorophenyl)sulfone, bis(4-amino-3-methoxy phenyl)decane, bis(4-aminophenyl)sulfide, bis(4-aminophenyl)telluride, bis(4-aminophenyl)selenide, bis(4-amino-3-methoxyphenyl)disulfide, 4,4'-methylenebis(2-iodoaniline), 4,4'-methylenebis(2-bromoaniline), 4,4'-methylenebis(2-fluoroaniline), 4-aminophenyl-2-chloroaniline, or the like.

Aromatic polyamine having a secondary amino group is preferably, for example, polyamine in which a part or entirety of —NH$_2$ in non-substituted aromatic polyamine above, aromatic polyamine having an alkyl group, or aromatic polyamine having an electron-withdrawing group has been substituted with —NH—R' (R' representing an alkyl group, and for example, representing a lower alkyl group such as a methyl group or an ethyl group having a carbon number from 1 to 4) [such as 4,4'-di(methylamino)diphenylmethane or 1-methyl-2-methylamino-4-aminobenzene], or the like. Aromatic polyamine having a secondary amino group may be, for example, low-molecular-weight polyamide polyamine obtained by condensation of dicarboxylic acid (such as a dimer acid) and an excess (at least 2 moles per 1 mole of acid) of polyamines (such as alkylenediamine above or polyalkylenepolyamine), polyamide polyamine, polyether polyamine, a hydride of a cyanoethylated product of polyether polyol (such as polyalkylene glycol), or the like.

Polythiol (16) is preferably, for example, alkane dithiol having a carbon number from 2 to 36 (such as ethanedithiol, 1,4-butanedithiol, or 1,6-hexanedithiol), or the like.

Primary and/or secondary monoamine(s) (17) is/are preferably, for example, alkylamine having a carbon number from 2 to 24 (such as ethylamine, n-butyl amine, isobutylamine, diethylamine, or n-butyl-n-dodecyl amine), or the like.

<Epoxy Resin>

An epoxy resin is preferably, for example, a ring-opening polymerized product of polyepoxide (18), a polyadduct of polyepoxide (18) and an active hydrogen containing compound [such as water, diol (10), dicarboxylic acid (12), polyamine (15), or polythiol (16)], a cured product of polyepoxide (18) and acid anhydride of dicarboxylic acid (12), or the like.

Polyepoxide (18) is not particularly limited so long as it has two or more epoxy groups in a molecule. From a point of view of mechanical characteristics of a cured product, a substance having 2 epoxy groups in a molecule is preferred as polyepoxide (18). An epoxy equivalent (a molecular weight per one epoxy group) of polyepoxide (18) is preferably from 65 to 1000 and more preferably from 90 to 500. When an epoxy equivalent is 1000 or smaller, a cross-linked structure becomes dense so that such physical properties as water resistance, chemical resistance, and mechanical strength of the cured product improve. On the other hand, when an epoxy equivalent is smaller than 65, synthesis of polyepoxide (18) may become difficult.

Polyepoxide (18) is preferably, for example, an aromatic polyepoxy compound, an aliphatic polyepoxy compound, or the like.

An aromatic polyepoxy compound is preferably, for example, glycidyl ether of polyhydric phenol, glycidyl ester of aromatic polyvalent carboxylic acid, glycidyl aromatic polyamine, a glycidylated product of aminophenol, or the like.

The glycidyl ether of polyhydric phenol is preferably, for example, bisphenol F diglycidyl ether, bisphenol A diglycidyl ether, bisphenol B diglycidyl ether, bisphenol AD diglycidyl ether, bisphenol S diglycidyl ether, halogenated bisphenol A diglycidyl, tetrachloro bisphenol A diglycidyl ether, catechin diglycidyl ether, resorcinol diglycidyl ether, hydroquinone diglycidyl ether, pyrogallol triglycidyl ether, 1,5-dihydroxynaphthaline diglycidyl ether, dihydroxybiphenyl diglycidyl ether, octachloro-4,4'-dihydroxybiphenyl diglycidyl ether, tetramethylbiphenyl diglycidyl ether, dihydroxynaphthyl cresol triglycidyl ether, tris(hydroxyphenyl)methane triglycidyl ether, dinaphthyl triol triglycidyl ether, tetrakis(4-hydroxyphenyl)ethane tetraglycidyl ether, p-glycidyl phenyl dimethyl tolyl bisphenol A glycidyl ether, trismethyl-t-butyl-butylhydroxy methane triglycidyl ether, 9,9'-bis(4-hydroxyphenyl)fluorene diglycidyl ether, 4,4'-oxybis(1,4-phenylethyl)tetracresol glycidyl ether, 4,4'-oxybis(1,4-phenylethyl)

phenyl glycidyl ether, bis(dihydroxynaphthalene)tetraglycidyl ether, glycidyl ether of phenol, glycidyl ether of a cresol novolac resin, glycidyl ether of a limonene phenol novolac resin, diglycidyl ether obtained from reaction between 2 moles of bisphenol A and 3 moles of epichlorohydrin, or the like. Glycidyl ether of polyhydric phenol may be, for example, polyglycidyl ether of polyphenol obtained from condensation reaction between phenol and glyoxal, glutaraldehyde, or formaldehyde, or may be polyglycidyl ether of polyphenol obtained from condensation reaction between resorcin and acetone.

The glycidyl ester of aromatic polyvalent carboxylic acid is preferably, for example, phthalic acid diglycidyl ester, isophthalic acid diglycidyl ester, terephthalic acid diglycidyl ester, or the like.

Glycidyl aromatic polyamine is preferably, for example, N,N-diglycidyl aniline, N,N,N',N'-tetraglycidyl xylylene diamine, N,N,N',N'-tetraglycidyl diphenylmethane diamine, or the like.

Other than the compounds listed above, an aromatic polyepoxy compound may be triglycidyl ether of p-aminophenol (an example of a glycidylated product of aminophenol), a diglycidyl urethane compound obtained from reaction between tolylene diisocyanate or diphenylmethane diisocyanate and glycidol, a glicidyl group containing polyurethane (pre)polymer obtained from reaction between tolylene diisocyanate or diphenylmethane diisocyanate, glycidol, and polyol, diglycidyl ether of an adduct of AO to bisphenol A, or the like.

An aliphatic polyepoxy compound is preferably, for example, a chain aliphatic polyepoxy compound, a cyclic aliphatic polyepoxy compound, or the like. The aliphatic polyepoxy compound may be a copolymer of diglycidyl ether and glycidyl(meth)acrylate.

A chain aliphatic polyepoxy compound is preferably, for example, polyglycidyl ether of polyhydric aliphatic alcohol, polyglycidyl ester of polyvalent fatty acid, glycidyl aliphatic amine, or the like.

The polyglycidyl ether of polyhydric aliphatic alcohol is preferably, for example, ethylene glycol diglycidyl ether, propylene glycol diglycidyl ether, tetramethylene glycol diglycidyl ether, 1,6-hexanediol diglycidyl ether, polyethylene glycol diglycidyl ether, polypropylene glycol diglycidyl ether, polytetramethylene glycol diglycidyl ether, neopentyl glycol diglycidyl ether, trimethylolpropane polyglycidyl ether, glycerol polyglycidyl ether, pentaerythritol polyglycidyl ether, sorbitol polyglycidyl ether, polyglycerol polyglycidyl ether, or the like.

The polyglycidyl ester of polyvalent fatty acid is preferably, for example, diglycidyl oxalate, diglycidyl maleate, diglycidyl succinate, diglycidyl glutarate, diglycidyl adipate, diglycidyl pimelate, or the like.

Glycidyl aliphatic amine is preferably, for example, N,N,N',N'-tetraglycidylhexamethylene diamine or the like.

A cyclic aliphatic polyepoxy compound is preferably, for example, trisglycidyl melamine, vinyl cyclohexene dioxide, limonene dioxide, dicyclopentadiene dioxide, bis(2,3-epoxy cyclopentyl)ether, ethylene glycol bisepoxy dicyclopentyl ether, 3,4-epoxy-6-methylcyclohexylmethyl-3',4'-epoxy-6'-methylcyclohexane carboxylate, bis(3,4-epoxy-6-methylcyclohexylmethyl)adipate, bis(3,4-epoxy-6-methylcyclohexylmethyl)butylamine, dimer acid diglycidyl ester, or the like. A cyclic aliphatic polyepoxy compound may be a hydrogenated product of the aromatic polyepoxy compound above.

<Polyamide Resin>

A polyamide resin is preferably, for example, a ring-opening polymer of lactam, a polycondensed product of aminocarboxylic acid, a polycondensed product of polycarboxylic acid and polyamine, or the like.

<Polyimide Resin>

A polyimide resin is preferably, for example, an aliphatic polyimide resin (such as a condensed polymer obtained from aliphatic carboxylic dianhydride and aliphatic diamine), an aromatic polyimide resin (such as a condensed polymer obtained from aromatic carboxylic dianhydride and aliphatic diamine or aromatic diamine), or the like.

<Silicon Resin>

A silicon resin is preferably, for example, a compound having in a molecular chain, at least one of silicon-silicon bond, silicon-carbon bond, siloxane bond, or silicon-nitrogen bond (such as polysiloxane, polycarbosilane, or polysilazane) or the like.

<Phenol Resin>

A phenol resin is preferably, for example, a condensed polymer obtained from phenols (such as phenol, cresol, nonyl phenol, lignin, resorcin, or catechol) and aldehydes (such as formaldehyde, acetaldehyde, or furfural), or the like.

<Melamine Resin>

A melamine resin is preferably, for example, a condensed product obtained from melamine and formaldehyde, or the like.

<Urea Resin>

A urea resin is preferably, for example, a polycondensed product obtained from urea and formaldehyde, or the like.

<Aniline Resin>

An aniline resin is preferably, for example, a product obtained from reaction between aniline and aldehydes in an acidic condition, or the like.

<Ionomer Resin>

An ionomer resin is preferably, for example, a copolymer of a monomer having polymeric double bond (such as an α-olefin based monomer or a styrene based monomer) and α,β-unsaturated carboxylic acid (such as acrylic acid, methacrylic acid, maleic acid, itaconic acid, maleic acid monomethyl ester, maleic anhydride, or maleic acid monoethyl ester), in which a part or entirety of carboxylic acid is carboxylate (such as potassium salt, sodium salt, magnesium salt, or calcium salt), or the like.

<Polycarbonate Resin>

A polycarbonate resin is preferably, for example, a condensed polymer of bisphenols (such as bisphenol A, bisphenol F, or bisphenol S) and phosgene, diester carbonate, or the like, or the like.

<Crystallinity and Non-Crystallinity>

The shell resin (a) may be a crystalline resin (a1), a non-crystalline resin (a2), or combination of the crystalline resin (a1) and the non-crystalline resin (a2). From a point of view of fixability of toner particles, the shell resin (a) is preferably the crystalline resin (a1).

"Crystallinity" herein means that a ratio between a softening point of a resin (hereinafter abbreviated as "Tm") and a maximum peak temperature (hereinafter abbreviated as "Ta") of heat of fusion of the resin (Tm/Ta) is not lower than 0.8 and not higher than 1.55 and that a result obtained in differential scanning calorimetry (DSC) does not show stepwise change in amount of heat absorption but has a clear heat absorption peak. "Non-crystallinity" herein means that a ratio between Tm and Ta (Tm/Ta) is higher than 1.55. Tm and Ta can be measured with a method below.

A flow tester (capillary rheometer) (such as "CFT-500D" manufactured by Shimadzu Corporation) can be used to measure Tm. Specifically, while 1 g of a measurement sample is heated at a temperature increase rate of 6° C./min., a plunger applies load of 1.96 MPa to the measurement sample to thereby extrude the measurement sample from a nozzle having a diameter of 1 mm and a length of 1 mm. Relation between "an amount of lowering of the plunger (a value of flow)" and a "temperature" is plotted in a graph. A temperature at the time when an amount of lowering of the plunger is ½ of a maximum value of the amount of lowering is read from the graph, and this value (a temperature at which half of the measurement sample was extruded from the nozzle) is adopted as Tm.

A differential scanning calorimeter (such as "DSC210" manufactured by Seiko Instruments, Inc.) can be used to measure Ta. Specifically, a sample to be used for measurement of Ta is initially subjected to pre-treatment. After the sample is molten at 130° C., a temperature is lowered from 130° C. to 70° C. at a rate of 1.0° C./min., and thereafter a temperature is lowered from 70° C. to 10° C. at a rate of 0.5° C./min. Then, with the DSC method, a temperature of the sample is raised at a temperature increase rate of 20° C./min., change in heat absorption and generation of the sample is measured, and relation between an "amount of heat absorption and generation" and a "temperature" is plotted in a graph. Here, a temperature of a heat absorption peak observed in a range from 20 to 100° C. is defined as Ta'. When there are a plurality of heat absorption peaks, a temperature of a peak largest in amount of heat absorption is defined as Ta'. After the sample was stored for 6 hours at (Ta'−10)° C., it is in turn stored for 6 hours at (Ta'−15)° C.

Then, with the DSC method, the sample subjected to the pre-treatment above is cooled to 0° C. at a temperature lowering rate of 10° C./min., a temperature is raised at a temperature increase rate of 20° C./min., change in heat absorption and generation is measured, and relation between an "amount of heat absorption and generation" and a "temperature" is plotted in a graph. A temperature at which an amount of heat absorption attains to a maximum value is defined as a maximum peak temperature (Ta) of heat of fusion.

<Heat of Melting>

In a case where the shell resin (a) is the crystalline resin (a1), the shell resin (a) desirably satisfies a condition that heat of fusion with DSC of the shell resin (a) satisfies Equations (3) to (4) below:

$$5 \leq H1 \leq 70 \quad \text{Equation (3)}$$

$$0.2 \leq H2/H1 \leq 1.0 \quad \text{Equation (4)}$$

where H1 represents heat of fusion (J/g) at the time of initial temperature increase with DSC and H2 represents heat of fusion (J/g) at the time of second temperature increase with DSC.

H1 is an index of a rate of melting of the shell resin (a). In general, since a resin having heat of fusion has sharp-melting capability, it can be molten with less energy. Therefore, by selecting a resin having heat of fusion as the shell resin (a), energy required at the time of fixation can be lowered. Therefore, a resin having heat of fusion is preferably selected as the shell resin (a). If heat of fusion which the resin has is too great, it may be difficult to sufficiently melt the resin. Preferably, relation of $6 \leq H1 \leq 65$ is satisfied and more preferably relation of $7 \leq H1 \leq 65$ is satisfied.

H2/H1 in Equation (4) above is an index of a rate of crystallization of the shell resin (a). In general, in a case where particles made of a resin (resin particles) are used as they are molten and thereafter cooled, if a non-crystallized portion is present in crystal components in the resin particles, such a disadvantage that a resistance value of the resin particles is lowered or the resin particles are plasticized is caused. If such a disadvantage is caused, performance of the resin particles obtained by cooling may be different from performance as originally designed. From the foregoing, it is necessary to quickly crystallize crystal components in the resin particles and to avoid influence on performance of the resin particles. H2/H1 is more preferably not lower than 0.3 and more preferably not lower than 0.4. If a rate of crystallization of the shell resin (a) is high, H2/H1 is close to 1.0 and hence H2/H1 preferably takes a value close to 1.0.

H2/H1 in Equation (4) above does not exceed 1.0 theoretically, however, a value actually measured with DSC may exceed 1.0. Even a case where a value (H2/H1) actually measured with DSC exceeds 1.0 is also assumed to satisfy Equation (4) above.

H1 and H2 can be measured in compliance with "testing methods for heat of transitions of plastics" under JIS-K7122 (1987). Specifically, initially, 5 mg of the shell resin (a) is taken and introduced in an aluminum pan. With a differential scanning calorimetry apparatus (such as "RDC220" manufactured by SII Nano Technology Inc. or "DSC20" of Seiko Instruments Inc.) and with a rate of temperature increase being set to 10° C./min., a temperature at a heat absorption peak of the shell resin (a) owing to melting (melting point) is measured and an area S1 of a heat absorption peak is found. H1 can be calculated from found area S1 of the heat absorption peak. After H1 is calculated, a rate of cooling is set to 90° C./min., thereafter cooling to 0° C. is carried out, a rate of temperature increase is set to 10° C./min., a temperature at a heat absorption peak of the shell resin (a) owing to melting (melting point) is measured, and an area S2 of a heat absorption peak is found. H2 can be calculated from found area S2 of the heat absorption peak.

<Melting Point>

The shell resin (a) has a melting point preferably from 0 to 220° C., more preferably from 30 to 200° C., and further preferably from 40 to 80° C. From a point of view of particle size distribution of toner particles, powder fluidity of the liquid developer (X), heat-resistant storage stability of the liquid developer (X), resistance to stress of the liquid developer (X), and the like, the shell resin (a) has a melting point preferably not lower than a temperature at the time of manufacturing of the liquid developer (X). If a melting point of the shell resin is lower than a temperature at the time of manufacturing of the liquid developer, toner particles may unite with each other and the toner particles may break. In addition, a width of distribution in particle size distribution of the toner particles may be great. In other words, variation in particle size of toner particles may be great.

A melting point is herein measured with the use of a differential scanning calorimetry apparatus (such as "DSC20" or "SSC/580" manufactured by Seiko Instruments, Inc.) in compliance with a method defined under ASTM D3418-82.

<Mn and Mw>

Mn [obtained from measurement with gel permeation chromatography (hereinafter abbreviated as "GPC")] of the shell resin (a) is preferably from 100 to 5000000, preferably from 200 to 5000000, and further preferably from 500 to 500000.

Mn and Mw of a resin (except for a polyurethane resin) herein are measured under conditions below, with the use of GPC, with regard to a soluble content of tetrahydrofuran (hereinafter abbreviated as "THF").

Measurement Apparatus: "HLC-8120" manufactured by Tosoh Corporation

Column: "TSKgel GMHXL" (two) manufactured by Tosoh Corporation and "TSKgel Multipore HXL-M" (one) manufactured by Tosoh Corporation Sample Solution: 0.25 mass % of THF solution Amount of Injection of Sample Solution into Column: 100 µl Flow Rate: 1 ml/min.

Measurement Temperature: 40° C.

Detection Apparatus Refraction index detector

Reference Material: 12 standard polystyrenes manufactured by Tosoh Corporation (TSK standard POLYSTYRENE) (molecular weight: 500, 1050, 2800, 5970, 9100, 18100, 37900, 96400, 190000, 355000, 1090000, 2890000)

In a case where a polyurethane resin is adopted as the shell resin (a), Mn and Mw are measured under conditions below, with the use of GPC.

Measurement Apparatus: "HLC-8220GPC" manufactured by Tosoh Corporation

Column: "Guardcolumn α" (one) and "TSKgel α-M" (one)

Sample Solution: 0.125 mass % of dimethylformamide solution

Amount of Injection of Sample Solution into Column: 100 µl

Flow Rate: 1 ml/min.

Measurement Temperature: 40° C.

Detection Apparatus: Refraction index detector

Reference Material: 12 standard polystyrenes manufactured by Tosoh Corporation (TSK standard POLYSTYRENE) (molecular weight: 500, 1050, 2800, 5970, 9100, 18100, 37900, 96400, 190000, 355000, 1090000, 2890000)

<SP Value>

The shell resin (a) has an SP value preferably from 7 to 18 $(cal/cm^3)^{1/2}$ and more preferably from 8 to 14 $(cal/cm^3)^{1/2}$.

<Core Resin (b)>

Mn of the core resin (b) and a urethane group concentration (mass %) in the core resin (b) satisfy Equations (1) to (2) below:

$$-0.00003x+2.03 \leq y \leq -0.00003x+6.95 \quad \text{Equation (1)}$$

$$10000 \leq x \leq 50000 \quad \text{Equation (2)}$$

where x represents Mn of the core resin (b) and y represents a urethane group concentration (mass %) in the core resin (b). Urethane group concentration y (mass %) in the core resin (b) is calculated in accordance with an Equation (5) below. [Mass of urethane group in core resin (b)] in Equation (5) below is calculated, assuming that a urethane group (—NH—CO—O—) has a molecular weight of 59.

$$y=[\text{Mass of urethane group in core resin } (b)]/[\text{Mass of core resin } (b)] \times 100 \quad \text{Equation (5)}$$

Mn of the core resin (b) (that is, x in Equations (1) to (2) above) is an index for melt viscosity of the core resin (b). Mn of the core resin (b) satisfying Equation (2) above means that melt viscosity of the core resin (b) has been optimized. Therefore, by employing the liquid developer (X) according to the present embodiment as a liquid developer to be used for electrophotography, electrostatic recording, electrostatic printing, or the like, fixability of the toner particles (C) is improved. In addition, since elasticity of the core resin (b) in a high-temperature region is maintained, occurrence of hot offset can be prevented.

On the other hand, when Mn of the core resin exceeds 50000, melt viscosity of the core resin cannot sufficiently be low. Therefore, fixability of the toner particles lowers. In addition, when Mn of the core resin exceeds 50000, a particle size of the toner particles (C) is greater. Therefore, if a liquid developer containing the core resin having Mn exceeding 50000 is employed as a liquid developer to be used for electrophotography, electrostatic recording, electrostatic printing, or the like, image quality is lowered. When Mn of the core resin is lower than 10000, melt viscosity of the core resin is too low. Therefore, it is difficult to maintain elasticity of the core resin in a high-temperature region, and hence hot offset takes place.

A urethane group concentration in the core resin (b) (that is, y in Equation (1) above) is an index of elasticity of the core resin (b). In a case where the liquid developer (X) according to the present embodiment is employed as the liquid developer to be used for electrophotography, electrostatic recording, electrostatic printing, or the like, by employing a resin of which melt viscosity is low and of which urethane group concentration has been optimized, that is, by employing a resin satisfying Equations (1) to (2) above, the resin can be provided with elasticity in a high-temperature region. Therefore, occurrence of hot offset can be prevented. In addition, since a region of a fixation temperature is greater, fixability of toner particles is improved.

On the other hand, if a urethane group concentration in the core resin becomes too high, that is, if a urethane group concentration in the core resin exceeds a numeric value on the right side of Equation (1) above, melt viscosity of the core resin becomes higher. Therefore, fixability of the toner particles lowers. When a urethane group concentration in the core resin is too low, that is, when a urethane group concentration in the core resin is lower than a numeric value on the left side of Equation (1) above, melt viscosity of the core resin is too low. Therefore, it is difficult to maintain elasticity of the core resin in a high-temperature region and hence hot offset occurs.

Mn of the core resin (b) preferably satisfies an Equation (6) below.

$$15000 \leq x \leq 45000 \quad \text{Equation (6)}$$

By adjusting as appropriate Mn of a polyester resin which is a source material of a polyurethane resin and a molar ratio between an isocyanate group and a hydroxyl group at the time of manufacturing of the core resin (b), Mn of the core resin (b) and a urethane group concentration in the core resin (b) can be adjusted.

A melting point, a glass transition point (hereinafter abbreviated as "Tg"), and an SP value of the core resin (b) are preferably adjusted as appropriate in accordance with applications of the liquid developer (X). For example, in a case where the liquid developer (X) according to the present embodiment is employed as a liquid developer to be used for electrophotography, electrostatic recording, electrostatic printing, or the like, the core resin (b) has a melting point preferably from 20 to 300° C. and more preferably from 80 to 250° C. The core resin (b) has Tg preferably from 20 to 200° C. and more preferably from 40 to 150° C. The core resin (b) has an SP value preferably from 8 to 16 $(cal/cm^3)^{1/2}$ and more preferably from 9 to 14 $(cal/cm^3)^{1/2}$.

The melting point is measured in accordance with the method described in <Melting Point> above. Tg may be measured with the DSC method or with a flow tester. In a case where Tg is measured with the DSC method, for example, a differential scanning calorimetry apparatus ("DSC20", "SSC/580", "DSC6200", or the like manufactured by Seiko Instruments, Inc.) is preferably used to measure Tg in compliance with a method defined under ASTM D3418-82, In a case where Tg is measured with a flow tester, a flow tester (capillary rheometer) (such as "CFT-500 type" manufactured by Shimadzu Corporation) is preferably employed. One example of measurement conditions of Tg in this case is shown below.

Load: 3 MPa
Rate of Temperature Increase: 3.0° C./min.
Die Diameter: 0.50 mm
Die Length: 10.0 mm Mn and Mw of the core resin (b) are measured under conditions below, with the use of GPC.

Measurement Apparatus: "HLC-8220GPC" manufactured by Tosoh Corporation
Column: Shodex KF-404HQ and Shodex KF-402HQ (each manufactured by Showa Denko K.K.)
Sample Solution: 0.25 mass % of THF solution
Amount of Injection of THF Solution into Column: 100 μl
Flow Rate: 0.3 ml/min.
Detection Apparatus: RI (refraction index) detector
Calibration Curve: Standard polystyrene A urethane group concentration in the core resin (b) can be measured, for example, with the use of GCMS. Specifically, the core resin (b) is pyrolyzed, and then a urethane group concentration in the core resin (b) is calculated based on a ratio of ionic strength detected from the pyrolyzed core resin (b).

The urethane group concentration in the core resin (b) was herein measured under conditions shown below.

Apparatus: "QP2010" manufactured by Shimadzu Corporation
Column: "UltraALLOY-5" manufactured by Frontier Laboratories Ltd. (inner diameter: 0.25 mm, length: 30 m, thickness: 0.25 μm)
Temperature Increase Condition: Temperature Increase Range: 100° C. to 320° C. (held at 320° C.), Rate of Temperature Increase: 20° C./min.

Pyrolysis of the core resin (b) in measurement of a urethane group concentration in the core resin (b) was herein carried out under conditions shown below.

Apparatus: "PY-2020iD" manufactured by Frontier Laboratories Ltd.
Mass of Sample: 0.1 mg
Heating Temperature: 550° C.
Heating Time Period: 0.5 minute A specific example of the core resin (b) is not particularly limited so long as it satisfies Equations (1) to (2) above. The core resin (b) may be, for example, polyurethane resins listed in <Polyurethane Resin> above, which satisfy Equations (1) to (2) above. The core resin (b) may be a resin having a resin other than a polyurethane resin (such as a polyester resin) as a basic skeleton and having a urethane group in part, which satisfies Equations (1) to (2) above.

The core resin (b) is preferably a crystalline resin. In a case where the core resin (b) is the crystalline resin, it preferably satisfies Equations (3) to (4) above shown in <Heat of Melting> above.

<Toner Particles>

The shell particles (A) are preferably smaller in particle size than the core particles (B). From a point of view of uniformity in particle size of the toner particles (C), a particle size ratio [(volume average particle size of shell particles (A))/(volume average particle size of core particles (B))] is preferably within a range from 0.001 to 0.3. More preferably, the lower limit of the particle size ratio is 0.003 and the upper limit thereof is 0.25. When the particle size ratio is higher than 0.3, the shell particles (A) are less likely to efficiently adsorb to the surfaces of the core particles (B), and hence a width of distribution in particle size distribution of the obtained toner particles (C) tends to be great. On the other hand, when the particle size ratio is lower than 0.001, manufacturing of the shell particles (A) may become difficult.

In order to achieve a particle size suited to obtain toner particles (C) having a desired particle size and to accommodate a particle size ratio within the preferred range above, a volume average particle size of the shell particles (A) is preferably adjusted as appropriate. A volume average particle size of the shell particles (A) is preferably from 0.0005 to 30 μm. The upper limit of the volume average particle size of the shell particles (A) is more preferably 20 μm and further preferably 10 μm. The lower limit of the volume average particle size of the shell particles (A) is more preferably 0.01 μm, further preferably 0.02 μm, and most preferably 0.04 μm. For example, in a case where toner particles (C) having a volume average particle size of 1 μm are desirably obtained, the shell particles (A) have a volume average particle size preferably from 0.0005 to 0.3 μm and more preferably from 0.001 to 0.2 μm. For example, in a case where toner particles (C) having a volume average particle size of 10 μm are desirably obtained, the shell particles (A) have a volume average particle size preferably from 0.005 to 3 μm and more preferably from 0.05 to 2 μm. For example, in a case where toner particles (C) having a volume average particle size of 100 μm are desirably obtained, the shell particles (A) have a volume average particle size preferably from 0.05 to 30 μm and more preferably from 0.1 to 20 μm.

From a point of view of ease in control of the particle size ratio above within the preferred range above, the core particles (B) have the volume average particle size preferably from 0.1 to 300 μm, more preferably from 0.5 to 250 and further preferably from 1 to 200 μm.

The "volume average particle size" herein can be measured by using, for example, a laser particle size distribution analyzer (such as "LA-920" manufactured by Horiba, Ltd. or "Multisizer III" manufactured by Beckman Coulter) or by using "ELS-800" (manufactured by Otsuka Electronics Co., Ltd.) using a laser Doppler method as an optical system or the like. If different measurement apparatuses measure a volume average particle size and there is variation in measurement values, a measurement value obtained by "ELS-800" is adopted.

A mass ratio between the shell particles (A) and the core particles (B) [(A):(B)] is preferably from 1:99 to 70:30. From a point of view of uniformity in a particle size of toner particles (C), heat-resistant storage stability of the liquid developer (X), and the like, the ratio [(A):(B)] above is more preferably from 2:98 to 50:50 and further preferably from 3:97 to 35:65. When a content (a mass ratio) of the shell particles is too low, blocking resistance of the toner particles may lower. When a content (a mass ratio) of the shell particles is too high, uniformity in particle size of the toner particles may lower.

From a point of view of fluidity, a melt leveling characteristic, and the like of the liquid developer (X), the toner particles (C) preferably have a spherical shape. Specifically, an average value of circularity of the toner particles (C) (average circularity) is preferably not smaller than 0.92 and not greater than 1.0, more preferably not smaller than 0.97 and not greater than 1.0, and further preferably not smaller than 0.98 and not greater than 1.0. As average circularity of the toner particles (C) is closer to 1.0, the toner particles (C) have a shape closer to a sphere. When the core particles (B) are spherical, the toner particles (C) tend to be spherical and hence the core particles (B) are preferably spherical.

Average circularity herein is found by optically sensing the toner particles (C), and it is a value obtained by dividing a circumferential length of a circle equal in area to a projection area of the toner particles (C) by a circumferential length of the optically sensed toner particles (C). Specifically, average circularity is measured with a flow particle image analyzer (such as "FPIA-2000" manufactured by Sysmex Corporation). Specifically, 100 to 150 ml of water from which an impure solid has been removed in advance is introduced in a prescribed container, 0.1 to 0.5 ml of a surfactant (such as "Drywell" manufactured by Fujifilm Corporation) is added as a dispersant, and approximately 0.1 to 9.5 g of a measurement sample is further added. A suspension in which a measurement sample was thus dispersed is subjected to dispersion treatment approximately for 1 to 3 minute(s) with the use of an ultrasonic disperser (such as "Ultrasonic Cleaner Model VS-150" manufactured by Velvo-Clear). Thus, a dispersion concentration is set to 3000 to 10000/µL. A shape and particle size distribution of the measurement sample are measured, with the use of the sample solution subjected to dispersion treatment.

Though the volume average particle size of the toner particles (C) is preferably determined as appropriate depending on applications, it is generally preferably not smaller than 0.01 µm and not greater than 100 µm. The upper limit of the volume average particle size of the toner particles (C) is more preferably 40 µm, further preferably 30 µm, and most preferably 20 µm. The lower limit of the volume average particle size of the toner particles (C) is more preferably 0.3 µm and further preferably 0.5 µm.

From a point of view of uniformity in particle size of the toner particles (C), a coefficient of variation of volume distribution of the toner particles (C) is preferably not lower than 1% and not higher than 100%, more preferably from 1 to 50%, further preferably from 1 to 30%, and most preferably from 1 to 25%. A coefficient of variation of volume distribution herein is measured with such a particle size distribution analyzer as a laser particle size distribution analyzer (such as "LA-920" manufactured by Horiba, Ltd.).

From a point of view of uniformity in particle size of the toner particles (C), fluidity of the liquid developer (X), and heat-resistant storage stability of the liquid developer (X), a ratio of surface coverage of the core particles (B) with the shell particles (A) in the toner particles (C) is preferably not lower than 50% and more preferably not lower than 80%. Surface coverage means that the shell particles (A) are attached to or cover the surfaces of the core particles (B). The ratio of surface coverage of the core particles (B) with the shell particles (A) can be found, for example, based on an Equation (7) below, from analysis of an image obtained by a scanning electron microscope (SEM). By changing a ratio of surface coverage found in Equation (7) below, a shape of the toner particles (C) can be controlled.

Surface coverage ratio (%)=Area of core particles ($B$) covered with shell particles ($A$)/[(Area of core particles ($B$) covered with shell particles ($A$)+ Area of core particles ($B$) exposed through shell particles ($A$))]×100        Equation (7)

From a point of view of fluidity of the liquid developer (X), surface center line average roughness (Ra) of the toner particles (C) is preferably from 0.01 to 0.8 µm, Surface center line average roughness (Ra) is a value obtained by calculating an arithmetic mean of absolute values of deviations between a roughness curve and a center line of the roughness curve, and it is measured with a scanning probe microscope system (for example, manufactured by Toyo Corporation) or the like.

From a point of view of particle size distribution of the toner particles (C) and heat-resistant storage stability of the liquid developer (X), the core-shell structure of the toner particles (C) is preferably composed of 1 to 70 mass % (more preferably 5 to 50 mass % and further preferably 10 to 35 mass %) of the shell particles (A) and 30 to 99 mass % (more preferably 50 to 95 mass % and further preferably 65 to 90 mass %) of the core particles (B), with respect to a mass of the toner particles (C).

From a point of view of fixability of the toner particles (C) and heat-resistant storage stability of the liquid developer (X), a content of the toner particles (C) in the liquid developer (X) is preferably from 10 to 50 mass %, more preferably from 15 to 45 mass %, and further preferably from 20 to 40 mass %.

<Additive>

The toner particles (C) in the present embodiment preferably contain a coloring agent in at least one of the shell particles (A) and the core particles (B), and they may further contain an additive other than the coloring agent (such as a filler, an antistatic agent, a release agent, a charge control agent, a UV absorber, an antioxidant, an antiblocking agent, a heat-resistant stabilization agent, or a fire retardant).

<Coloring Agent>

Though a known coloring agent can be employed as a coloring agent without being particularly limited, from a point of view of cost, light resistance, coloring capability, and the like, pigments shown below are preferably employed. In terms of color construction, pigments shown below are normally categorized into a black pigment, a yellow pigment, a magenta pigment, and a cyan pigment, and colors (color images) other than black are basically toned by subtractive color mixture of a yellow pigment, a magenta pigment, and a cyan pigment. The coloring agent may be obtained by subjecting a pigment shown below to surface treatment with the use of a solvent which is acidic, basic, or the like. For example, an acidic or basic synergist may be used together with pigments shown below.

A black pigment is preferably, for example, carbon black or the like.

A yellow pigment is preferably, for example, a disazo based yellow pigment such as C. I. (color index) Pigment Yellow 12, 13, 14, 17, 55, 81, 83, 180, or 185, or the like.

A magenta pigment is preferably, for example, an azo lake based magenta pigment such as C. I. Pigment Red 48, 57 (carmine 6B), 5, 23, 60, 114, 146, or 186, an insoluble azo based magenta pigment, a thioindigo based magenta pigment such as C. I. Pigment Red 88, C. I. Pigment Violet 36, or C. I. Pigment Violet 38, a quinacridone based magenta pigment such as C. I. Pigment Red 122 or 209, a naphthol based magenta pigment such as C. I. Pigment Red 269, or the like. As a magenta pigment, at least one of a quinacridone based pigment, a carmine based pigment, and a naphthol based pigment is preferably contained among these, and more preferably, two or three types of these three types of pigments are contained.

A cyan pigment is preferably, for example, a copper phthalocyanine blue based cyan pigment such as C. I. Pigment Blue 15:1 or 15:3, a phthalocyanine green based pigment, or the like.

<Wax>

From a point of view of heat-resistant storage stability of the liquid developer (X) or the like, at least one of a wax (c) and a modified wax (d) obtained by graft polymerization of a vinyl monomer with the wax (c) (hereinafter abbreviated as "modified wax (d)") is preferably contained in the core particles (B) (a core layer) as an additive.

A content of the wax (c) is preferably not higher than 20 mass % and more preferably from 1 to 15 mass % with respect to the mass of the core particles (B). A content of the modified wax (d) is preferably not higher than 10 mass % and more preferably from 0.5 to 8 mass % with respect to the mass of the core particles (B). A total content of the wax (c) and the modified wax (d) is preferably not higher than 25 mass % and more preferably from 1 to 20 mass % with respect to the mass of the core particles (B).

The wax (c) is preferably, for example, a synthetic wax (such as a polyolefin wax), a natural wax (such as a paraffin wax, a microcrystalline wax, a carnauba wax, a carbonyl group containing wax, or combination thereof), or the like. Among these, the paraffin wax or the carnauba wax is preferred as the wax (c). The paraffin wax is preferably, for example, a petroleum based wax having a melting point from 50 to 90° C. and mainly composed of straight-chain saturated hydrocarbon having a carbon number from 20 to 36, or the like. The carnauba wax is preferably, for example, an animal/vegetable wax having a melting point from 50 to 90° C. and a carbon number from 16 to 36, or the like.

From a point of view of a release characteristic, Mn of the wax (c) is preferably from 400 to 5000, more preferably from 1000 to 3000, and further preferably from 1500 to 2000. Mn of the wax (c) is herein measured with GPC. At the time of measurement of Mn of the wax (c), for example, o-dichlorobenzene is preferably employed as a solvent, and for example, polystyrene is preferably employed as a reference material.

In combined use of the wax (c) and the modified wax (d), the wax (c) is preferably dispersed, together with the modified wax (d), in the core resin (b) after it is subjected to treatment of at least one of melting, kneading, and mixing treatment in the absence of a solvent and heating, dissolving, and mixing treatment in the presence of an organic solvent. By thus allowing the modified wax (d) to coexist at the time of dispersion treatment of the wax, a wax group portion of the modified wax (d) efficiently adsorbs to the surface of the wax (c) or a part of a wax group portion of the modified wax (d) is efficiently entangled with the inside of a matrix structure of the wax (c). Thus, affinity between the surface of the wax (c) and the core resin (b) is better, so that the wax (c) can more uniformly be encapsulated in the core particles (B). Therefore, control of a dispersed state of the wax (c) is facilitated.

The modified wax (d) is obtained by graft polymerization of a vinyl monomer with the wax (c). A wax used for the modified wax (d) is preferably, for example, those listed as specific examples of the wax (c) above. A preferred material for the wax used for the modified wax (d) is preferably, for example, those listed as preferred materials for the wax (c) above. A monomer having polymeric double bond is preferably, for example, the monomers (1) to (9) having polymeric double bond forming the vinyl resin above. The monomer (1) above, the monomer (2) above, or the monomer (6) above is preferred among these. A monomer having polymeric double bond is preferably, for example, any of the monomers (1) to (9) above. At least two of them may be used together.

An amount of a wax component (including unreacted wax) in the modified wax (d) is preferably from 0.5 to 99.5 mass %, more preferably from 1 to 80 mass %, further preferably from 5 to 50 mass %, and most preferably from 10 to 30 mass %.

From a point of view of heat-resistant storage stability of the liquid developer (X), Tg of the modified wax (d) is preferably from 40 to 90° C. and more preferably from 50 to 80° C.

Mn of the modified wax (d) is preferably from 1500 to 10000 and more preferably from 1800 to 9000. If Mn of the modified wax (d) is from 1500 to 10000, mechanical strength of the toner particles (C) is good.

A method of manufacturing such a modified wax (d) is not particularly limited. For example, the modified wax (d) can be obtained by dissolving or dispersing the wax (c) in a solvent (such as toluene or xylene), heating the resultant solution to 100 to 200° C., thereafter polymerizing a monomer having polymeric double bond, and then distilling out the solvent.

A method of mixing the wax (c) and the modified wax (d) is preferably, for example, a method described in [i] to [iii] below, or the like. Among [i] to [iii] below, [ii] is more preferably employed.

[i]: Melting the wax (c) and the modified wax (d) at a temperature not lower than a melting point of each of them and mixing and kneading the same.

[ii]: Dissolving or suspending the wax (c) and the modified wax (d) in an organic solvent (u) which will be described later, and thereafter precipitating the same in a liquid through cooling crystallization, solvent crystallization, or the like, or precipitating the same in a gas through spray drying or the like.

[iii]: Dissolving or suspending the wax (c) and the modified wax (d) in an organic solvent (u) which will be described later, and thereafter mechanically crushing the same with a dry method with the use of a disperser or the like.

A method of dispersing the wax (c) and the modified wax (d) in the core resin (b) is preferably, for example, a method of dissolving or dispersing the wax (c) and the modified wax (d) as well as the core resin (b) in respective solvents and then mixing them, or the like.

<Insulating Liquid>

The insulating liquid (L) is preferably, for example, hexane, octane, isooctane, decane, isodecane, decalin, nonane, dodecane, isododecane, cyclohexane, cyclooctane, cyclodecane, benzene, toluene, xylene, mesitylene, Isopar E, Isopar G, Isopar H, Isopar L ("Isopar" being a trade name of Exxon Mobil Corporation), Shellsol 70, Shellsol 71 ("Shellsol" being a trade name of Shell Oil Company), Amsco OMS, Amsco 460 ("Amsco" being a trade name of American Mineral Spirits Company), IP Solvent 2028 (a trade name of Idemitsu Kosan Co., Ltd.), silicone oil, liquid petrolatum, or the like. Two or more may be used together.

From a point of view of odor, what is preferred as the insulating liquid (L) among these is a solvent having a boiling point not lower than 100° C., and what is more preferred is a hydrocarbon based solvent having a carbon number not smaller than 10 (such as dodecane, isodedecane, and liquid petrolatum) or silicone oil, and what is further preferred is liquid petrolatum.

The insulating liquid (L) preferably has a relative dielectric constant at 20° C., not lower than 1 and not higher than 4. Thus, charge performance of the liquid developer (X) can be stabilized. A relative dielectric constant of the insulating liquid (L) is calculated by using a dielectric constant of the insulating liquid (L) found with a bridge method (JIS C2101-1999). Specifically, a capacitance $C_0$ (pF) in an empty state before filling with the insulating liquid (L) and an equivalent parallel capacitance $C_x$ (pF) in a state filled with the insulating liquid (L) are measured, which are substituted into an Equation (8) below, to thereby calculate a dielectric constant $\in$ of the insulating liquid (L). A relative dielectric constant of the insulating liquid (L) is found based on a ratio between calculated $\in$ and a relative dielectric constant 1.000585 of air.

$$\in = C_x/C_0 \qquad \text{Equation (8)}$$

Preferably, a solvent contained in the liquid developer (X) according to the present embodiment is substantially the insulating liquid (L) alone. The liquid developer (X), however, may contain other organic solvents, in a range preferably not higher than 1 mass % and more preferably not higher than 0.5 mass %.

[Method for Manufacturing Liquid Developer]

Though a method for manufacturing the liquid developer (X) according to the present embodiment is not particularly limited, for example, it includes the steps of preparing a dispersion liquid obtained by dispersing the shell particles (A) containing the shell resin (a) in the insulating liquid (L) (a dispersion liquid (W) of the shell particles (A)), preparing a solution obtained by dissolving the core resin (b) (a solution (Y) for forming the core resin (b)), and dispersing the solution (Y) for forming the core resin (b) in the dispersion liquid (W) of the shell particles (A). Preferably, the method for manufacturing the liquid developer (X) according to the present embodiment includes the steps of preparing a dispersion liquid in which a coloring agent is dispersed (a dispersion liquid of a coloring agent) and distilling out a first organic solvent (M) contained in the solution (Y) for forming the core resin (b). Each step will be shown below.

<Preparation of Dispersion Liquid (W) of Shell Particles (A)>

In the step of preparing the dispersion liquid (W) of the shell particles (A), the shell particles (A) may be manufactured and then the shell particles (A) may be dispersed in the insulating liquid (L), or the shell particles (A) may be manufactured through polymerization reaction or the like in the insulating liquid (L). The shell resin (a) contained in the shell particles (A) is preferably the resin exemplified in <Shell Resin (a)> above.

In a case where the shell particles (A) are manufactured and then the shell particles (A) are dispersed in the insulating liquid (L), a method in any of [4] to [6] below is preferably employed and [6] below is more preferably employed. In a case where the shell particles (A) are manufactured through polymerization reaction or the like in the insulating liquid (L), a method in any of [1] to [3] below is preferably employed and [1] below is more preferably employed.

[1]: A case where the shell resin (a) is a vinyl resin. A monomer is polymerized in a solvent containing the insulating liquid (L) with a dispersion polymerization method or the like. Thus, a dispersion liquid (W1) of the shell particles (A) is directly manufactured. As necessary, a solvent other than the insulating liquid (L) is distilled out of the dispersion liquid (W) of the shell particles (A). In distilling out a solvent other than the insulating liquid (L), a low-boiling-point component in the insulating liquid (L) may be distilled out. This is also the case in the step of distilling out a solvent other than the insulating liquid (L) shown below.

[2]; A case where the shell resin (a) is a polyaddition resin or a condensed-type resin such as a polyester resin or a polyurethane resin. A precursor (a monomer, an oligomer, or the like) or a solution of the precursor is dispersed in the insulating liquid (L) in the presence of an appropriate dispersant as necessary and thereafter the precursor is cured by heating, addition of a curing agent, or the like. As necessary, a solvent other than the insulating liquid (L) is distilled out.

[3]: A case where the shell resin (a) is a polyaddition resin or a condensed-type resin such as a polyester resin or a polyurethane resin. An appropriate emulsifier is dissolved in a precursor (a monomer, an oligomer, or the like) or a solution of the precursor (a starting material is preferably a liquid, however, it may be a material liquefied by heating), and thereafter the insulating liquid (L) serving as a poor solvent is added thereto, to thereby re-precipitate the precursor. Thereafter, the precursor is cured by addition of a curing agent or the like, and as necessary, a solvent other than the insulating liquid (L) is distilled out.

[4]: The shell resin (a) obtained by polymerization reaction in advance (any polymerization reaction such as addition polymerization, ring-opening polymerization, polyaddition, addition condensation, or condensation polymerization may be acceptable, which is also the case with [5] and [6] below) is crushed with a pulverizer of a mechanical rotation type or a jet type and thereafter classified. The shell particles (A) are thus obtained. The obtained shell particles (A) are dispersed in the insulating liquid (L) in the presence of an appropriate dispersant.

[5]: A resin solution in which the shell resin (a) obtained through polymerization reaction in advance has been dissolved (this resin solution may be a solution obtained by polymerizing the shell resin (a) in a solvent) is sprayed in mist. The shell particles (A) are thus obtained. The obtained shell particles (A) are dispersed in the insulating liquid (L) in the presence of an appropriate dispersant.

[6]: By adding a poor solvent (preferably the insulating liquid (L)) to a resin solution in which the shell resin (a) obtained through polymerization reaction in advance has been dissolved (this resin solution may be a solution obtained by polymerizing the shell resin (a) in a solvent) or by cooling a resin solution obtained by heating and dissolving the shell resin (a) in advance, and further by causing an appropriate dispersant to exist, the shell particles (A) are precipitated. As necessary, a solvent other than the insulating liquid (L) is distilled out.

In a case where the shell particles (A) are manufactured and then the shell particles (A) are dispersed in the insulating liquid (L), a method of manufacturing the shell particles (A) is not particularly limited. A method of manufacturing the shell particles (A) in a dry method shown in [7] below may be employed, or a method of manufacturing the shell particles (A) in a wet method shown in [8] to [13] below may be employed. From a point of view of ease in manufacturing of the shell particles (A), a method of manufacturing the shell particles (A) is preferably a wet method, more preferably [10] below, [12] below, or [13] below, and further preferably [12] or [13] below.

[7]: The shell resin (a) is crushed with a dry method with the use of a known dry type crusher such as a jet mill,

[8]: Powders of the shell resin (a) are dispersed in an organic solvent, and the resultant product is crushed with a wet method with the use of a known wet type disperser such as a bead mill or a roll mill,

[9]: A solution of the shell resin (a) is sprayed and dried with the use of a spray dryer or the like.

[10]: A poor solvent is added to a solution of the shell resin (a) or the solution is cooled, to thereby supersaturate and precipitate the shell resin (a).

[11]: A solution of the shell resin (a) is dispersed in water or an organic solvent.

[12]: A precursor of the shell resin (a) is polymerized in water with an emulsion polymerization method, a soap-free emulsion polymerization method, a seed polymerization method, a suspension polymerization method, or the like.

[13]; A precursor of the shell resin (a) is polymerized in an organic solvent through dispersion polymerization or the like.

A dispersant in [2] and [4] to [6] above is preferably, for example, a known surfactant (s), an oil-soluble polymer (t), or the like. As an adjuvant for dispersion, for example, an organic solvent (u), a plasticizer (v), and the like can be used together.

The surfactant (s) is preferably, for example, an anionic surfactant (s-1), a cationic surfactant (s-2), an amphoteric surfactant (s-3), a nonionic surfactant (s-4), or the like. Two or more surfactants may be used together.

The anionic surfactant (s-1) is preferably, for example, ether carboxylic acid (carboxylate) having an alkyl group having a carbon number from 8 to 24 [such as (poly)oxyethylene (the number of repeating units being from 1 to 100) lauryl ether sodium acetate], ether sulfuric acid ester salt having an alkyl group having a carbon number from 8 to 24 [such as (poly)oxyethylene (the number of repeating units being from 1 to 100) sodium lauryl sulfate], sulfo succinic acid ester salt having an alkyl group having a carbon number from 8 to 24 [such as mono- or di-alkyl sulfosuccinic acid ester sodium salt, mono- or di-alkyl sulfosuccinic acid ester disodium salt, (poly)oxyethylene (the number of repeating units being from 1 to 100) mono- or di-alkyl sulfosuccinic acid ester sodium salt, or (poly)oxyethylene (the number of repeating units being from 1 to 100) mono- or di-alkyl sulfosuccinic acid ester disodium salt], (poly)oxyethylene (the number of repeating units being from 1 to 100) coconut oil fatty acid monoethanol sodium amidosulfate, sulfonate having an alkyl group having a carbon number from 8 to 24 (such as sodium dodecylbenzenesulfonate), phosphate salt having an alkyl group having a carbon number from 8 to 24 [such as sodium lauryl phosphate or (poly)oxyethylene (the number of repeating units being from 1 to 100) lauryl ether sodium phosphate], fatty acid salt (such as sodium laurate or triethanolamine laurate), acylated amino acid salt (such as coconut oil fatty acid methyltaurine sodium), or the like.

The cationic surfactant (s-2) is preferably, for example, a cation surfactant of a quaternary ammonium salt type, a cation surfactant of an amine salt type, or the like. The cation surfactant of the quaternary ammonium salt type is preferably, for example, a compound obtained by reaction between tertiary amines and a quaternization agent (such as halogenated alkyl such as methyl chloride, methyl bromide, ethyl chloride, and benzyl chloride, dimethyl sulfate, dimethyl carbonate, or ethyleneoxide), or the like. A specific example of the cation surfactant of the quaternary ammonium salt type is, for example, didecyldimethyl ammonium chloride, stearyl trimethyl ammonium bromide, lauryl dimethylbenzyl ammonium chloride (benzalkonium chloride), polyoxyethylene trimethyl ammonium chloride, stearamide ethyl diethyl methyl ammonium methosulfate, or the like.

The cation surfactant of the amine salt type is preferably, for example, a compound obtained by neutralizing primary to tertiary amines with an inorganic acid (such as hydrochloric acid, nitric acid, sulfuric acid, or hydriodic acid) or an organic acid (such as acetic acid, formic acid, oxalic acid, lactic acid, gluconic acid, adipic acid, or alkyl phosphate), or the like. The cation surfactant of the primary amine salt type is preferably, for example, an inorganic acid salt of aliphatic higher amine (higher amine such as lauryl amine, stearyl amine, cured tallow amine, or rosin amine) or an organic acid salt thereof, or it may be higher fatty acid (such as stearic acid or oleic acid) salt of lower amines, or the like. The cation surfactant of the secondary amine salt type is preferably, for example, an inorganic acid salt of aliphatic amine such as an adduct of ethylene oxide to aliphatic amine, an organic acid salt thereof, or the like.

The amphoteral surfactant (s-3) is preferably, for example, a carboxybetaine type amphoteral surfactant [such as fatty acid amide propyl dimethylamino betaine acetate having a carbon number from 10 to 18 (such as coconut oil fatty acid amidopropylbetaine), alkyl (having a carbon number from 10 to 18) dimethylamino betaine acetate (such as lauryl dimethylamino betaine acetate), or imidazolinium type carboxybetaine (such as 2-alkyl-N-carboxymethyl-N-hydroxyethyl imidazolinium betaine)], a sulfobetaine type amphoteral surfactant [such as fatty acid amide propylhydroxy ethylsulfobetaine having a carbon number from 10 to 18 (such as coconut oil fatty acid amidopropyl dimethylhydroxyethyl sulfobetaine) or dimethyl alkyl (having a carbon number from 10 to 18) dimethylhydroxy ethylsulfobetaine (such as lauryl hydroxysulfobetaine)], an amino acid type amphoteral surfactant (such as β-laurylamino sodium propionate), or the like.

The nonionic surfactant (s-4) is preferably, for example, an AO addition type nonionic surfactant, a polyhydric alcohol type nonionic surfactant, or the like.

The AO addition type nonionic surfactant is preferably, for example, an adduct (the number of added moles per active hydrogen being from 1 to 30) of AO (having a carbon number from 2 to 4, preferably 2) to higher alcohol (having a carbon number from 8 to 18), an adduct (the number of added moles being from 1 to 30) of EO to alkyl (having a carbon number from 1 to 12) phenol, an adduct (the number of added moles per active hydrogen being from 1 to 40) of AO (having a carbon number from 2 to 4, preferably 2) to higher amine (having a carbon number from 8 to 22), an adduct (the number of added moles per active hydrogen being from 1 to 60) of EO to fatty acid (having a carbon number from 8 to 18), an adduct (the number of added moles per active hydrogen being from 1 to 50) of EO to polypropylene glycol (Mn=200 to 4000), polyoxyethylene (the number of repeating units being from 3 to 30) alkyl (having a carbon number from 6 to 20) allyl ether, or an adduct (the number of added moles per active hydrogen being from 1 to 30) of EO to fatty acid (having a carbon number from 8 to 24) ester of polyhydric (divalent to octavalent or higher) alcohol (having a carbon number from 2 to 30), such as an adduct (the number of added moles per active hydrogen being from 1 to 30) of EO to sorbitan monolaurate or an adduct (the number of added moles per active hydrogen being from 1 to 30) of EO to sorbitan monooleate, or the like.

The polyhydric alcohol type nonionic surfactant may be, for example, fatty acid (having a carbon number from 8 to 24) ester of polyhydric (divalent to octavalent or higher) alcohol (having a carbon number from 2 to 30), such as glycerol monooleate, sorbitan monolaurate, or sorbitan monooleate, or the like, or may be fatty acid (having a carbon number from 10 to 18) alkanolamide such as monoethanolamide laurate or diethanolamide laurate, or the like.

The oil-soluble polymer (t) is preferably, for example, a polymer having at least one group of an alkyl group having a carbon number not smaller than 4, a dimethylsiloxane group, and a functional group having a fluorine atom, or the like. More preferably, the oil-soluble polymer (t) has at least one group of an alkyl group having affinity with the insulating liquid (L), a dimethylsiloxane group, and a functional group having a fluorine atom, and has a chemical structure having affinity with the core resin (b).

The oil-soluble polymer (t) is more preferably obtained by polymerizing or copolymerizing at least one monomer of a monomer having an alkyl group having a carbon number not smaller than 4, a monomer having a dimethylsiloxane group (or a reactive oligomer), and a monomer having a fluorine atom, among the monomers (1) to (9) having polymeric double bond above.

The organic solvent (u) may be, for example, the insulating liquid (L) or an organic solvent other than the insulating liquid (L) (such as a solvent other than the insulating liquid (L), of first organic solvents (M) which will be described later). Since a solvent other than the insulating liquid (L) is distilled out after preparation of the dispersion liquid (W) of the shell particles (A), it is preferably a solvent readily distilled out, and for example, it is preferably lower in boiling point than the insulating liquid (L).

The plasticizer (v) may be added to the insulating liquid (L) as necessary in dispersing the shell particles (A), or may be added to a solvent containing the core resin (b) or the like.

The plasticizer (v) is not particularly limited, and it is preferably, for example, a plasticizer shown as plasticizers (v1) to (v6) below.

The plasticizer (v1) is preferably, for example, phthalate (such as dibutyl phthalate, dioctyl phthalate, butyl benzyl phthalate, or diisodecyl phthalate), or the like.

The plasticizer (v2) is preferably, for example, aliphatic dibasic acid ester (such as di-2-ethylhexyl adipate or 2-ethylhexyl sebacate), or the like.

The plasticizer (v3) is preferably, for example, trimellitate (such as tri-2-ethylhexyl trimellitate or trioctyl trimellitate), or the like.

The plasticizer (v4) is preferably, for example, phosphate (such as triethyl phosphate, tri-2-ethylhexyl phosphate, or tricresyl phosphate), or the like.

The plasticizer (v5) is preferably, for example, fatty acid ester (such as butyl oleate), or the like.

The plasticizer (v6) is combination of materials listed as the plasticizers (v1) to (v5) above.

The insulating liquid (L) is preferably a material having a relative dielectric constant at 20° C. not lower than 1 and not higher than 4 among the materials listed in <Insulating Liquid (L)> above. Thus, charge performance of the liquid developer (X) can be stabilized.

<Preparation of Solution (Y) for Forming Core Resin (b)>

In the step of preparing the solution (Y) for forming the core resin (b), the core resin (b) or a precursor (b0) of the core resin (b) is dissolved in the first organic solvent (M). The core resin (b) is preferably a material satisfying Equations (1) to (2) above. Thus, toner particles (C) excellent in fixability and capable of preventing hot offset from occurring can be provided.

A method of dissolving the core resin (b) or the precursor (b0) of the core resin (b) in the first organic solvent (M) may be any method and a known method can be employed. For example, a method of introducing the core resin (b) or the precursor (b0) of the core resin (b) in the first organic solvent (M) and then stirring the resultant product may be employed, or a method of introducing the core resin (b) or the precursor (b0) of the core resin (b) in the first organic solvent (M) and then heating the resultant product may be employed.

The first organic solvent (M) is not particularly limited so long as it is a solvent capable of dissolving the core resin (b) at room temperature or under heating. The first organic solvent (M) has an SP value preferably from 8.5 to 20 $(\text{cal/cm}^3)^{1/2}$ and more preferably from 10 to 19 $(\text{cal/cm}^3)^{1/2}$. In a case where a mixed solvent is employed as the first organic solvent (M), a weighted average value of SP values calculated from an SP value of each solvent should only be within the range above, assuming that an additive property is ensured. If the SP value of the first organic solvent (M) is out of the range above, solubility of the core resin (b) or the precursor (b0) of the core resin (b) may be insufficient.

The first organic solvent (M) preferably has an SP value within the range above, and it is preferably selected as appropriate in accordance with a material for the core resin (b) or a material for the precursor (b0) of the core resin (b). The first organic solvent (M) is preferably, for example, an aromatic hydrocarbon based solvent such as toluene, xylene, ethylbenzene, or tetralin, an aliphatic or alicyclic hydrocarbon based solvent such as n-hexane, n-heptane, mineral spirit, or cyclohexane, a halogen based solvent such as methyl chloride, methyl bromide, methyl iodide, methylene dichloride, carbon tetrachloride, trichloroethylene, or perchlorethylene, an ester based or ester ether based solvent such as ethyl acetate, butyl acetate, methoxy butyl acetate, methyl Cellosolve acetate, or ethyl Cellosolve acetate, an ether based solvent such as diethyl ether, THF, dioxane, ethyl Cellosolve, butyl Cellosolve, or propylene glycol monomethyl ether, a ketone based solvent such as acetone, methyl ethyl ketone, methyl isobutyl ketone, di-n-butyl ketone, or cyclohexanone, an alcohol based solvent such as methanol, ethanol, n-propanol, isopropanol, n-butanol, isobutanol, t-butanol, 2-ethylhexyl alcohol, or benzyl alcohol, an amide based solvent such as dimethylformamide or dimethylacetamide, a sulfoxide based solvent such as dimethyl sulfoxide, a heterocyclic compound based solvent such as N-methylpyrrolidone, or the like. A mixed solvent in which two or more of these are mixed may be employed.

From a point of view of odor or from a point of view of ease in distilling out a dispersion liquid (X') of resin particles (a dispersion liquid obtained by <Dispersing Solution (Y) for Forming Core Resin (b) in Dispersion Liquid (W) of Shell Particles (A)> below), the first organic solvent (M) has a boiling point preferably not higher than 100° C. and more preferably not higher than 90° C.

In a case where a polyurethane resin, a polyester resin having a urethane group in part, or an epoxy resin having a urethane group in part is selected as the core resin (b), a preferred first organic solvent (M) is for example, acetone, dimethylformamide, dimethyl sulfoxide, N-methylpyrrolidone, or the like. A mixed solvent in which two or more of these are mixed may be employed.

From a point of view of particle size distribution of the toner particles (C), the solution (Y) for forming the core resin (b) has viscosity preferably from 10 to 50000 mPa·s and more preferably from 100 to 10000 mPa·s. Viscosity of the solution (Y) for forming the core resin (b) is preferably measured, for example, with a type B viscometer. The first organic solvent (M) is preferably selected such that viscosity of the solution (Y) for forming the core resin (b) is within the range above.

The precursor (b0) of the core resin (b) is not particularly limited so long as it can become the core resin (b) through chemical reaction. For example, in a case where the core resin (b) is a vinyl resin, the precursor (b0) of the core resin (b) is preferably the monomers (1) to (9) having polymeric double bond above (each may be used alone or two or more types may be used as mixed).

In a case where the monomers (1) to (9) having polymeric double bond above are employed as the precursor (b0) of the core resin (b), a method of making the core resin (b) through reaction of the precursor (b0) of the core resin (b) is preferably, for example, a method of dispersing and suspending an oil phase containing an oil-soluble initiator and a monomer in the first organic solvent (M) and causing radical polymerization reaction of the obtained suspension through heating.

The oil-soluble initiator above is preferably, for example, an oil-soluble peroxide based polymerization initiator (I), an oil-soluble azo based polymerization initiator (II), or the like. The oil-soluble initiator may be, for example, a redox type polymerization initiator (III) obtained by using together a reducing agent in the oil-soluble peroxide based polymerization initiator (I). Two or more of the oil-soluble peroxide based polymerization initiator (I), the oil-soluble azo based polymerization initiator (II), and the redox type polymerization initiator (III) may be used together as the oil-soluble initiator.

The oil-soluble peroxide based polymerization initiator (I) is preferably, for example, acetyl peroxide, t-butylperoxy-2-ethylhexanoate, benzoyl peroxide, para-chlorobenzoyl peroxide, cumene peroxide, or the like.

The oil-soluble azo based polymerization initiator (II) is preferably, for example, 2,2'-azobisisobutyronitrile, 2,2'-azobis-2,4-dimethyl valeronitrile, dimethyl-propionate), 2,2'-azobis(4-methoxy-2,4-dimethyl valeronitrile), or the like.

A nonaqueous type redox type polymerization initiator (III) is preferably, for example, obtained by using an oil-soluble reducing agent such as tertiary amine, naphthenate, mercaptans, or an organic metal compound (such as triethylaluminum, triethylboron, or diethyl zinc) together with oil-soluble peroxide such as hydroperoxide, dialkyl peroxide, or diacyl peroxide.

In a case where the core resin (b) is a condensed type resin (such as a polyurethane resin, an epoxy resin having a urethane group in part, or a polyester resin having a urethane group in part), the precursor (b0) of the core resin (b) is preferably, for example, combination of a prepolymer ($\alpha$) having a reactive group (hereinafter abbreviated as "prepolymer ($\alpha$)") and a curing agent ($\beta$), or the like.

The "reactive group" which the prepolymer ($\alpha$) has refers to a group which can react with the curing agent ($\beta$). In this case, a method of obtaining the core resin (b) by causing the precursor (b0) of the core resin (b) to react is preferably a method of dispersing the prepolymer ($\alpha$) and the curing agent ($\beta$) in the insulating liquid (L), followed by heating, to thereby react the prepolymer ($\alpha$) and the curing agent ($\beta$) with each other, or the like.

Combination of the reactive group which the prepolymer ($\alpha$) has and the curing agent ($\beta$) is preferably, for example, [14] to [15] below or the like.

[14]: A reactive group which the prepolymer ($\alpha$) has is a functional group ($\alpha 1$) which can react with an active hydrogen compound and the curing agent ($\beta$) is an active hydrogen group containing compound ($\beta 1$).

[15]: A reactive group which the prepolymer ($\alpha$) has is an active hydrogen containing group ($\alpha 2$) and the curing agent ($\beta$) is a compound ($\beta 2$) which can react with an active hydrogen containing group.

In combination [14] above, the functional group ($\alpha 1$) which can react with an active hydrogen compound is preferably, for example, an isocyanate group ($\alpha 1a$), a blocked isocyanate group ($\alpha 1b$), an epoxy group ($\alpha 1c$), an acid anhydride group ($\alpha 1d$), an acid halide group ($\alpha 1e$), or the like. Among these, an isocyanate group ($\alpha 1a$), a blocked isocyanate group ($\alpha 1b$), or an epoxy group ($\alpha 1e$) is preferred as the functional group ($\alpha 1$), and among these, an isocyanate group ($\alpha 1a$) or a blocked isocyanate group ($\alpha 1b$) is more preferred as a functional group ($\alpha 1$).

The blocked isocyanate group ($\alpha 1b$) refers to an isocyanate group blocked by a blocking agent. The blocking agent is preferably, for example, oximes (such as acetoxime, methylisobutylketoxime, diethylketoxime, cyclopentanone oxime, cyclohexanone oxime, or methylethylketoxime), lactams (such as $\gamma$-butyrolactam, $\epsilon$-caprolactam, or $\gamma$-valerolactam), aliphatic alcohols having a carbon number from 1 to 20 (such as ethanol, methanol, or octanol), phenols (such as phenol, m-cresol, xylenol, or nonyl phenol), an active methylene compound (such as acetylacetone, ethyl malonate, or ethyl acetoacetate), a basic nitrogen containing compound (such as N,N-diethylhydroxylamine, 2-hydroxypyridine, pyridine N-oxide, or 2-mercaptopyridine), or the like. Two or more of these may be used together. Among these, oximes are preferred as the blocked isocyanate group ($\alpha 1b$) and methylethylketoxime is more preferred.

A constitutional unit of the prepolymer ($\alpha$) having a reactive group is preferably, for example, polyether ($\alpha w$), polyester ($\alpha x$), an epoxy resin ($\alpha y$), polyurethane ($\alpha z$), or the like. Among these, polyester ($\alpha x$), an epoxy resin ($\alpha y$), or polyurethane ($\alpha z$) is preferred as a constitutional unit of the prepolymer ($\alpha$), and polyester ($\alpha x$) or polyurethane ($\alpha z$) is more preferred.

Polyether ($\alpha w$) is preferably, for example, polyethylene oxide, polypropylene oxide, polybutylene oxide, polytetramethylene oxide, or the like.

Polyester ($\alpha x$) is preferably, for example, a polycondensed product of diol (11) above and dicarboxylic acid (13) above, polylactone (such as a ring-opening polymerization product of $\epsilon$-caprolactone), or the like.

The epoxy resin ($\alpha y$) is preferably, for example, an addition condensed product of bisphenols (such as bisphenol A, bisphenol F, or bisphenol S) and epichlorohydrin, or the like.

Polyurethane ($\alpha z$) is preferably, for example, a polyadduct of diol (11) above and polyisocyanate (15) above, a polyadduct of polyester ($\alpha x$) above and polyisocyanate (15) above, or the like.

A method of causing polyester ($\alpha x$), an epoxy resin ($\alpha y$), polyurethane ($\alpha z$), and the like to contain a reactive group is preferably, for example, a method shown in [16] to [17] below.

[16]: One of two or more constituent components is excessively used so that a functional group of a constituent component remains at a terminal.

[17]: One of two or more constituent components is excessively used so that a functional group of a constituent component remains at a terminal (a prepolymer is obtained) and a remaining functional group and a functional group which can react with that functional group are caused to react with each other, or a remaining functional group and a compound containing a functional group which can react with that functional group are caused to react with each other.

With the method in [16] above, a hydroxyl group containing polyester prepolymer, a carboxyl group containing polyester prepolymer, an acid halide group containing polyester prepolymer, a hydroxyl group containing epoxy resin prepolymer, an epoxy group containing epoxy resin prepolymer, a hydroxyl group containing polyurethane prepolymer, an isocyanate group containing polyurethane prepolymer, or the like is obtained.

For example, in a case where a hydroxyl group containing polyester prepolymer is to be obtained, a ratio between a polyol component and a polycarboxylic acid component should only be set such that an equivalent ratio between a hydroxyl group [OH] and a carboxyl group [COOH] ([OH]/[COOH]) is set preferably to 2/1 to 1/1, more preferably to 1.5/1 to 1/1, and further preferably to 1.3/1 to 1.02/1. Even though a skeleton changes or even in a case of obtaining a prepolymer having an end group, the ratio between the constituent components is preferably within the range above.

With the method in [17] above, an isocyanate group containing prepolymer is obtained by causing polyisocyanate to react with the prepolymer obtained in the method [16] above, a blocked isocyanate group containing prepolymer is obtained by causing a blocking polyisocyanate to react therewith, an epoxy group containing prepolymer is obtained by causing polyepoxide to react therewith, and an acid anhydride group containing prepolymer is obtained by causing polyacid anhydride to react therewith.

For example, in a case where an isocyanate group containing polyester prepolymer is to be obtained by causing a hydroxyl group containing polyester prepolymer to react with polyisocyanate, a ratio of polyisocyanate to a hydroxyl group containing polyester prepolymer should only be set such that an equivalent ratio between an isocyanate group [NCO] and a hydroxyl group [OH] of the hydroxyl group containing polyester ([NCO]/[OH]) is set preferably to 5/1 to 1/1, more preferably to 4/1 to 1.2/1, and further preferably to 2.5/1 to 1.5/1. Even though a skeleton changes or even in a case of obtaining a prepolymer having an end group, a ratio between the constituent components is preferably within the range above.

The number of reactive groups contained in one molecule of the prepolymer (α) is preferably one or more, more preferably 1.5 to 3 on average, and further preferably 1.8 to 2.5 on average. When the number of reactive groups contained in one molecule of the prepolymer (α) is within the range above, a molecular weight of a cured product obtained through reaction with the curing agent (β) is greater.

Mn of the prepolymer (α) is preferably from 500 to 30000, more preferably from 1000 to 20000, and further preferably from 2000 to 10000.

Mw of the prepolymer (α) is preferably from 1000 to 50000, more preferably from 2000 to 40000, and further preferably from 4000 to 20000.

Viscosity of the prepolymer (α) at 100° C. is preferably 200 Pa·s or lower and more preferably 100 Pa·s or lower. By setting viscosity of the prepolymer (α) to 200 Pa·s or lower, the core particles (B) narrow in distribution width in particle size distribution are obtained.

The active hydrogen group containing compound (β1) in combination [14] above is preferably, for example, polyamine (β1a) which may be blocked by a detachable compound (hereinafter abbreviated as "polyamine (β1a)"), polyol (β1b), polymercaptan (β1c), water, or the like. Among these, polyamine (β1a), polyol (β1b), or water is preferred as the active hydrogen group containing compound (β1), polyamine (β1a) or water is more preferred, and blocked polyamines or water are/is further preferred.

Polyamine (β1a) is preferably, for example, those listed as specific examples of polyamine (15) above. Polyamine (β1a) is preferably 4,4'-diaminodiphenylmethane, xylylenediamine, isophoron diamine, ethylenediamine, diethylenetriamine, triethylenetetramine, a mixture thereof, or the like.

In a case where polyamine (β1a) is polyamine blocked by a detachable compound, polyamine is preferably, for example, a ketimine compound obtained from polyamines above and ketones having a carbon number from 3 to 8 (such as acetone, methyl ethyl ketone, or methyl isobutyl ketone), an aldimine compound obtained from an aldehyde compound having a carbon number from 2 to 8 (such as formaldehyde or acetaldehyde), an enamine compound, an oxazolidine compound, or the like.

Polyol (β1b) is preferably, for example, those listed as specific examples of diol (10) above and polyol (11) above. Among these, diol (10) above alone or a mixture of diol (10) above and a small amount of polyol (11) is preferred as polyol (β1b).

Polymercaptan (β1c) is preferably, for example, ethanedithiol, 1,4-butanedithiol, 1,6-hexanedithiol, or the like.

As necessary, a reaction stop agent (βs) can be used together with the active hydrogen group containing compound (β1). By using the reaction stop agent (βs) at a certain ratio together with the active hydrogen group containing compound (β1), a molecular weight of the core resin (b) can be adjusted to a prescribed value. For the same reason, the reaction stop agent (βs) can also be used together with a compound (β2) which can react with an active hydrogen containing group in combination [15] above.

The reaction stop agent (βs) is preferably, for example, monoamine (such as diethylamine, dibutylamine, butylamine, laurylamine, monoethanolamine, or diethanolamine), blocked monoamine (such as a ketimine compound), monool (such as methanol, ethanol, isopropanol, butanol, or phenol), monomercaptan (such as butyl mercaptan or lauryl mercaptan), monoisocyanate (such as lauryl isocyanate or phenyl isocyanate), monoepoxide (such as butyl glycidyl ether), or the like.

The active hydrogen containing group (α2) which the prepolymer (α) has in combination [15] above is exemplified, for example, by an amino group (α2a), a hydroxyl group (such as an alcoholic hydroxyl group or a phenolic hydroxyl group) (α2b), a mercapto group (α2c), a carboxyl group (α2d), an organic group (α2e) in which the former are blocked by a detachable compound, or the like. Among these, an amino group (α2a), a hydroxyl group (α2b), or an organic group (α2e) is preferred, and a hydroxyl group (α2b) is more preferred.

The organic group (α2e) of which amino group is blocked by a detachable compound is preferably those listed as specific examples of polyamine (β1a) above.

The compound (β2) which can react with the active hydrogen containing group in combination [15] above is preferably, for example, polyisocyanate (β2a), polyepoxide (β2b), polycarboxylic acid (β2c), polyacid anhydride (β2d), polyacid halide (β2e), or the like. Among these, polyisocyanate (β2a) or polyepoxide (β2b) is preferred as the compound (β2), and polyisocyanate (β2a) is more preferred.

Polyisocyanate (β2a) is preferably, for example, those listed as specific examples of polyisocyanate (14) above. What is preferred as polyisocyanate (β2a) is preferably, for example, those listed as preferred specific examples of polyisocyanate (14) above.

Polyepoxide (β2b) is preferably, for example, those listed as specific examples of polyepoxide (18) above. What is preferred as polyepoxide (β2b) is, for example, those listed as preferred specific examples of polyepoxide (18) above.

Polycarboxylic acid (β2c) is preferably, for example, dicarboxylic acid (β2c-1), polycarboxylic acid (β2c-2) equal to or higher than trivalence, or the like. Among these, dicarboxylic acid (β2c-1) alone or a mixture of dicarboxylic acid (β2c-1) and a small amount of polycarboxylic acid (β2c-2) is preferred as polycarboxylic acid (β2c).

Dicarboxylic acid (β2c-1) is preferably, for example, those listed as specific examples of dicarboxylic acid (12) above and polycarboxylic acid (13) above. What is preferred as dicarboxylic acid (β2c-1) is those listed as preferred specific examples of dicarboxylic acid (12) above and polycarboxylic acid (13) above.

The polycarboxylic anhydride (β2d) is preferably, for example, pyromellitic anhydride or the like.

The polyacid halides (β2e) are preferably, for example, acid halide of polycarboxylic acid (β2c) above (such as acid chloride, acid bromide, or acid iodide), or the like.

A ratio of the curing agent (β) in the precursor (b0) of the core resin (b) is not particularly limited. A ratio of the curing agent (β) in the precursor (b0) of the core resin (b) should only be set such that an equivalent ratio between the reactive group [α] in the prepolymer (α) and the active hydrogen containing group [β] in the curing agent (β) ([α]/[β]) is preferably from 1/2 to 2/1, more preferably from 1.5/1 to 1/1.5, and further preferably from 1.2/1 to 1/1.2. In a case where water is employed as the curing agent (β), water is handled as a divalent active hydrogen compound.

<Preparation of Dispersion Liquid of Coloring Agent>

In the step of preparing a dispersion liquid of a coloring agent, a coloring agent may be dispersed in at least one of the dispersion liquid (W) of the shell particles (A) and the solution (Y) for forming the core resin (b), or a coloring agent may be dispersed in a prescribed organic solvent and then the dispersion liquid may be mixed with at least one of the dispersion liquid (W) of the shell particles (A) and the solution (Y) for forming the core resin (b).

The coloring agent is preferably, for example, at least one of the pigments listed in <Coloring Agent> above. A solution in which a coloring agent is to be dissolved or dispersed is preferably, for example, such an organic solvent as acetone.

<Dispersing Solution (Y) for Forming Core Resin (b) in Dispersion Liquid (W) of Shell Particles (A)>

In the step of dispersing the solution (Y) for forming the core resin (b) in the dispersion liquid (W) of the shell particles (A), the dispersion liquid (W) of the shell particles (A) and the solution (Y) for forming the core resin (b) are mixed. Thus, the solution (Y) for forming the core resin (b) is dispersed in the dispersion liquid (W) of the shell particles (A), and the toner particles (C) having the core-shell structure [that is, the toner particles (C) that the shell particles (A) are attached to or cover the surfaces of the core particles (B) containing the core resin (b)] are obtained. In a case where the solution (Y) for forming the core resin (b) contains the precursor (b0) of the core resin (b), the precursor (b0) of the core resin (b) reacts to become the core resin (b), and the core particles (B) containing the core resin (b) are formed.

Though a method of dispersing the solution (Y) for forming the core resin (b) in the dispersion liquid (W) of the shell particles (A) is not particularly limited, the solution (Y) for forming the core resin (b) is preferably dispersed in the dispersion liquid (W) of the shell particles (A) with the use of a dispersion apparatus.

The dispersion apparatus is not particularly limited so long as it is generally commercially available as an emulsifier, a disperser, or the like. A dispersion apparatus is preferably, for example, a batch type emulsifier such as Homogenizer (manufactured by IKA), Polytron (manufactured by Kinematica AG), or T.K. Auto Homo Mixer (manufactured by Tokushu Kika Kogyo Co., Ltd.), a continuous emulsifier such as Ebara Milder (manufactured by Ebara Corporation), T.K. Filmix and T.K. Pipeline Homo Mixer (manufactured by Tokushu Kika Kogyo Co., Ltd.), Colloid Mill (manufactured by Shinco Pantec Co., Ltd.), Slasher and Trigonal Wet Pulverizer (manufactured by Mitsui Miike Chemical Engineering Machinery Co., Ltd.), Cavitron (manufactured by Eurotec Co., Ltd.), or Fine Flow Mill (manufactured by Pacific Machinery & Engineering Co., Ltd.), a high-pressure emulsifier such as Microfluidizer (manufactured by Mizuho Industrial Co., Ltd.), Nanomizer (manufactured by Nanomizer Inc.), or APV Gaulin (manufactured by Gaulin), a membrane emulsifier such as Membrane Emulsifier (manufactured by Reica Co., Ltd.), a vibration emulsifier such as Vibro Mixer (Reica Co., Ltd.), an ultrasonic emulsifier such as Ultrasonic Homogenizer (manufactured by Branson), or the like. Among these apparatuses, from a point of view of particle size distribution of toner particles, APV Gaulin, Homogenizer, T.K. Auto Homo Mixer, Ebara Milder, T.K. Filmix, or T.K. Pipeline Homo Mixer is preferred.

Though a temperature at the time when the solution (Y) for forming the core resin (b) is dispersed in the dispersion liquid (W) of the shell particles (A) is not particularly limited, it is preferably from 0 to 150° C. (under pressure) and more preferably from 5 to 98° C. When viscosity of a solution obtained by dispersing the solution (Y) for forming the core resin (b) in the dispersion liquid (W) of the shell particles (A) (the dispersion liquid (X') of the resin particles) is high, viscosity of the solution (Y) for forming the core resin (b) is preferably lowered to a preferred range by raising a temperature at the time when the solution (Y) for forming the core resin (b) is dispersed in the dispersion liquid (W) of the shell particles (A). The preferred range of viscosity of the solution (Y) for forming the core resin (b) is as described in <Preparation of Solution (Y) for Forming Core Resin (b)> above, and it is from 10 to 50000 mPa·s (viscosity measured with a type B viscometer).

A ratio of mixing between the dispersion liquid (W) of the shell particles (A) and the solution (Y) for forming the core resin (b) is not particularly limited, however, preferably 50 to 2000 parts by mass and more preferably 100 to 1000 parts by mass of the dispersion liquid (W) of the shell particles (A) are contained with respect to 100 parts by mass of the core resin (b) or the precursor (b0) of the core resin (b) dissolved in the solution (Y) for forming the core resin (b). If at least 50 parts by mass of the dispersion liquid (W) of the shell particles (A) are contained with respect to 100 parts by mass of the core resin (b) or the precursor (b0) of the core resin (b), a state of dispersion of the core resin (b) or the precursor (b0) of the core resin (b) in the dispersion liquid (X') of the resin particles is good. When at most 2000 parts by mass of the dispersion liquid (W) of the shell particles (A) are contained with respect to 100 parts by mass of the core resin (b) or the precursor (b0) of the core resin (b), it is inexpensive.

Though the core-shell structure is formed by dispersing the solution (Y) for forming the core resin (b) in the dispersion liquid (W) of the shell particles (A), force of adsorption of the shell particles (A) to the core particles (B) is preferably controlled in accordance with methods shown in [18] to [20] below.

[18]: The shell particles (A) and the core particles (B) have charges opposite to each other in polarity. Here, as charges of the shell particles (A) and the core particles (B) are greater, force of adsorption of the shell particles (A) to the core particles (B) is stronger and hence a ratio of coverage of the surfaces of the core particles (B) with the shell particles (A) is higher.

[19]: The shell particles (A) and the core particles (B) have charges of the same polarity, so that a ratio of coverage of the surfaces of the core particles (B) with the shell particles (A) is lower. Here, when at least one of the surfactant (s) above and the oil-based polymer (t) above (in particular, which will make polarity opposite between the shell particles (A) and the core particles (B)) is used, force of adsorption of the shell particles (A) to the core particles (B) is stronger and hence a ratio of coverage of the surfaces of the core particles (B) with the shell particles (A) is higher.

[20]: A difference in SP value between the dispersion liquid (W) of the shell particles (A) and the solution (Y) for forming the core resin (b) is made smaller, so that force of adsorption of the shell particles (A) to the core particles (B) is stronger and hence a ratio of coverage of the surfaces of the core particles (B) with the shell particles (A) is higher.

Whether the core-shell structure that the shell particles (A) are attached to the surfaces of the core particles (B) or the core-shell structure that the shell particles (A) cover the surfaces of the core particles (B) is formed is dependent on physical properties of the first organic solvent (M) contained in the solution (Y) for forming the core resin (b), specifically, solubility of the shell particles (A) and/or the core resin (b) in the first organic solvent (M).

Specifically, when a solvent which dissolves the core resin (b) but does not dissolve the shell resin (a) is selected as the first organic solvent (M), the shell particles (A) are attached to the surfaces of the core particles (B).

On the other hand, when a solvent dissolving both of the shell resin (a) and the core resin (b) is selected as the first organic solvent (M), the shell particles (A) are attached to the surfaces of the core particles (B) while they are molten in the first organic solvent (M). Therefore, as the first organic solvent (M) is distilled out in a subsequent step, the first organic solvent (M) attached to the surfaces of the core particles (B) is also distilled out. Therefore, the surfaces of the core particles (B) are covered with the shell particles (A) and a film is formed. The surfaces of the core particles (B) being covered with the shell particles (A) to form a film will be denoted as "film formation treatment" below.

For film formation treatment, the first organic solvent (M) is preferably, for example, THF, toluene, acetone, methyl ethyl ketone, ethyl acetate, or the like, and it is more preferably acetone, ethyl acetate, or the like.

In performing film formation treatment, a content of the first organic solvent (M) in the dispersion liquid (X') of the resin particles is preferably from 10 to 50 mass % and more preferably from 20 to 40 mass %. In distilling out the first organic solvent (M) after the film formation treatment, the first organic solvent (M) should only be removed until a content of the first organic solvent (M) in the dispersion liquid (X') of the resin particles at a temperature not higher than 40° C. is preferably not higher than 1 mass % and more preferably not higher than 0.5 mass %. Thus, a surface of the core layer formed of the core particles (B) is covered with the shell resin (a) which has been dissolved in the first organic solvent (M) and hence a shell layer formed of the shell resin (a) is formed on the surface of the core layer.

In performing film formation treatment, an organic solvent to be used in the film formation treatment can be added to the dispersion liquid (X') of the resin particles. The first organic solvent (M) contained in the solution (Y) for forming the core resin (b), however, is preferably used as an organic solvent for film formation treatment without removing the first organic solvent after formation of the core particles (B). This is because the first organic solvent (M) is contained in the core particles (B) and hence the shell particles (A) can readily be dissolved in the first organic solvent (M) and aggregation of the core particles (B) is less likely.

In dissolving the shell particles (A) in the first organic solvent (M), a concentration of the first organic solvent (M) in the dispersion liquid (X') of the resin particles is preferably from 3 to 50 mass %, more preferably from 10 to 40 mass %, and further preferably from 15 to 30 mass %. The dispersion liquid (X') of the resin particles is preferably stirred, for example, for 1 to 10 hour(s). A temperature at the time when the shell particles (A) are dissolved in the first organic solvent (M) is preferably from 15 to 45° C. and more preferably from 15 to 30° C.

When the shell particles (A) are dissolved in the first organic solvent (M) to form a film on the surfaces of the core particles (B), a solid content in the dispersion liquid (X') of the resin particles (a content of a component other than a solvent) is preferably from 1 to 50 mass % and more preferably from 5 to 30 mass %. A content of the first organic solvent (M) before film formation treatment is preferably not higher than 2 mass %, more preferably not higher than 1 mass %, and further preferably not higher than 0.5 mass %. In a case where a solid content in the dispersion liquid (X') of the resin particles is high and in a case where a content of the first organic solvent (M) before film formation treatment exceeds 2 mass %, an aggregate may be generated when a temperature of the dispersion liquid (X') of the resin particles is raised to 60° C. or higher. A method of melting the shell particles (A) is not particularly limited, and for example, a method of heating preferably for 1 to 300 minute(s) preferably at a temperature from 40 to 100° C., more preferably from 60 to 90° C., and further preferably from 60 to 80° C. while stirring, or the like is preferred.

In performing film formation treatment, the dispersion liquid (X') of the resin particles of which content of the first organic solvent (M) before film formation treatment is not higher than 2 mass % is preferably heated, so that the shell particles (A) are molten on the surfaces of the core particles (B). Thus, toner particles (C) of which surfaces are smoother can be obtained. A heating temperature at this time is preferably not lower than Tg of the shell resin (a) and more preferably not higher than 80° C. If a heating temperature is lower than Tg of the shell resin, an effect obtained by heating (that is, an effect that the surfaces of the toner particles are smoother) may not be obtained. On the other hand, when a heating temperature exceeds 80° C., a shell layer may peel off from a core layer.

A method preferred as film formation treatment is a method of melting the shell particles (A) or combination of the method of dissolving the shell particles (A) and the method of melting the shell particles (A).

<Distilling Out First Organic Solvent (M) Contained in Solution (Y) for Forming Core Resin (b)>

In the step of distilling out the first organic solvent (M) contained in the solution (Y) for forming the core resin (b), the first organic solvent (M) is distilled out of the dispersion liquid (X') of the resin particles.

Though a method of distilling out the first organic solvent (M) from the dispersion liquid (X') of the resin particles is not particularly limited, for example, a method of distilling out the first organic solvent (M) at a reduced pressure from 0.02 to 0.066 MPa at a temperature not lower than 20° C. and not higher than a boiling point of the first organic solvent (M), or the like is preferred.

A content of the first organic solvent (M) in the dispersion liquid from which the first organic solvent (M) has been distilled out is preferably not higher than 1 mass % and more preferably not higher than 0.5 mass %. Some of the insulating liquid (L) (for example, a low boiling point component of the insulating liquid (L)) may also be distilled out together with the first organic solvent (M).

By controlling at least one of a difference in SP value between the shell resin (a) and the core resin (b) and a molecular weight of the shell resin (a), a shape of the toner particles (C) contained in the obtained liquid developer (X) and smoothness of the surfaces of the toner particles (C) can be controlled. When a difference in SP value is too small, toner particles having an irregular shape but having a smooth surface tend to be obtained. In contrast, when a difference in SP value is too large, toner particles having a spherical shape but having a grainy surface tend to be obtained. When a molecular weight of the shell resin (a) is too large, toner particles having a grainy surface tend to be obtained, and when a molecular weight of the shell resin (a) is too small, toner particles having a smooth surface tend to be obtained. When a difference in SP value is too small or too large, granulation becomes difficult. When a molecular weight of the shell resin (a) is too small, granulation again becomes difficult. From the foregoing, the difference in SP value is preferably from 0.01 to 5.0, more preferably from 0.1 to 3.0, and further preferably from 0.2 to 2.0 Mw of the shell resin (a) is preferably from 100 to 1000000, more preferably from 1000 to 500000, further preferably from 2000 to 200000, and most preferably from 3000 to 100000.

In manufacturing the core-shell structure in the present embodiment, the shell particles (A) may be attached to or cover the surfaces of the core particles (B) after the core particles (B) are manufactured in accordance with the manufacturing method in any of [7] to [13] above.

In the method for manufacturing the liquid developer (X) according to the present embodiment, an additive other than a coloring agent (such as a filler, an antistatic agent, a release agent, a charge control agent, a UV absorber, an antioxidant, an antiblocking agent, a heat-resistant stabilization agent, or a fire retardant) may be added to prepare at least one of the dispersion liquid (W) of the shell particles (A), the solution (Y) for forming the core resin (b), and the dispersion liquid of the coloring agent. In this case as well, by adding a solution in which an additive other than a coloring agent has been dissolved or dispersed to the dispersion liquid (W) of the shell particles (A) or the like, the additive can be added to the dispersion liquid (W) of the shell particles (A) or the like. Thus, the toner particles (C) in which an additive other than a coloring agent is contained in at least one layer of the core layer and the shell layer can be obtained.

EXAMPLES

Though the present invention will be described in further detail with reference to Examples, the present invention is not limited thereto, Manufacturing Example 1

Manufacturing of Polyester Resin

In a reaction vessel provided with a stirrer, a heating and cooling apparatus, a thermometer, a cooling pipe, and a nitrogen introduction pipe, 286 parts by mass of dodecanedioic acid, 190 parts by mass of 1,6-hexanediol, and 1 part by mass of titanium dihydroxybis(triethanolaminate) as a condensation catalyst were introduced. These were caused to react for 8 hours under a nitrogen current at 180° C. while generated water was distilled out. While a temperature was gradually raised to 220° C. and generated water was distilled out, they were caused to react for 4 hours under a nitrogen current. They were caused to react for 1 hour at a reduced pressure from 0.007 to 0.026 MPa. Thus, a polyester resin was obtained. The obtained polyester resin had a melting point of 68° C., Mn of 4900, and Mw of 10000. The melting point was measured in accordance with the method described in <Melting Point> above. Mn and Mw were measured in accordance with the method described in <Mn and Mw> above.

Manufacturing Example 2

Manufacturing of Dispersion Liquid (W1) of Shell Particles (A1)

In a beaker made of glass, 100 parts by mass of 2-decyltetradecyl(meth)acrylate, 30 parts by mass of methacrylic acid, 70 parts by mass of an equimolar reactant with hydroxyethyl methacrylate and phenyl isocyanate, and 0.5 part by mass of azobis methoxy dimethyl valeronitrile were introduced, and stirred and mixed at 20° C. Thus, a monomer solution was obtained.

Then, a reaction vessel provided with a stirrer, a heating and cooling apparatus, a thermometer, a dropping funnel, a desolventizer, and a nitrogen introduction pipe was prepared. In that reaction vessel, 195 parts by mass of THF were introduced and the monomer solution above was introduced in the dropping funnel provided in the reaction vessel. After a vapor phase portion of the reaction vessel was replaced with nitrogen, the monomer solution was dropped in THF in the reaction vessel for 1 hour at 70° C. in a sealed condition. Three hours after the end of dropping of the monomer solution, a mixture of 0.05 part by mass of azobis methoxy dimethyl valeronitrile and 5 parts by mass of THF was introduced in the reaction vessel and caused to react for 3 hours at 70° C. Thereafter, cooling to room temperature was carried out. Thus, a copolymer solution was obtained.

Four hundred parts by mass of the obtained copolymer solution were dropped in 600 parts by mass of Isopar L (manufactured by ExxonMobil) which was being stirred, and THF was distilled out at 40° C. at a reduced pressure of 0.039 MPa. Thus, the dispersion liquid (W1) of the shell particles (A1) was obtained. A laser particle size distribution analyzer ("LA-920" manufactured by Horiba, Ltd.) was used to measure a volume average particle size of the shell particles (A1) in the dispersion liquid (W1), which was 0.12 μm.

Manufacturing Example 3

Manufacturing of Dispersion Liquid (W2) of Shell Particles (A2)

In a beaker made of glass, 80 parts by mass of 2-decyltetradecyl(meth)acrylate, 10 parts by mass of methyl methacrylate, 10 parts by mass of methacrylic acid, 10 parts by mass of an equimolar reactant with an isocyanate group containing monomer "Karenz MOI" [manufactured by Showa Denko K.K.] and the polyester resin obtained in Manufacturing Example 1 above, and 0.5 part by mass of azobis methoxy dimethyl valeronitrile were introduced, and stirred and mixed at 20° C. Thus, a monomer solution was obtained.

Then, a reaction vessel provided with a stirrer, a heating and cooling apparatus, a thermometer, a dropping funnel, a desolventizer, and a nitrogen introduction pipe was prepared. In that reaction vessel, 195 parts by mass of THF were introduced, and the monomer solution above was introduced in the dropping funnel provided in the reaction vessel. After a vapor phase portion of the reaction vessel was replaced with nitrogen, the monomer solution was dropped in THF in the reaction vessel for 1 hour at 70° C. in a sealed condition. Three hours after the end of dropping of the monomer solution, a mixture of 0.05 part by mass of azobis methoxy dimethyl valeronitrile and 5 parts by mass of THF was introduced in the reaction vessel and caused to react for 3 hours at 70° C. Thereafter, cooling to room temperature was carried out. Thus, a copolymer solution was obtained.

Four hundred parts by mass of the obtained copolymer solution were dropped in 600 parts by mass of Isopar L (manufactured by ExxonMobil) which was being stirred, and THF was distilled out at 40° C. at a reduced pressure of 0.039 MPa. Thus, a dispersion liquid (W2) of shell particles (A2) was obtained. A volume average particle size of the shell particles (A2) in the dispersion liquid (W2) was measured in accordance with the method described in Manufacturing Example 2 above, which was 0.13 μm.

Manufacturing Example 4

Manufacturing of Solution (Y1) for Forming Core Resin (b1)

In a reaction vessel provided with a stirrer, a heating and cooling apparatus, and a thermometer, 966 parts by mass of polyester (Mn: 5000) obtained from sebacic acid, adipic acid, and ethylene glycol (a molar ratio of 0.8:0.2:1) and 300 parts by mass of acetone were introduced and stirred, to thereby uniformly dissolve polyester in acetone. In this solution, 34 parts by mass of isophoron diisocyanate (IPDI) were introduced and caused to react for 6 hours at 80° C. When an NCO value of a product obtained through reaction attained to 0, 28 parts by mass of trimellitic anhydride were introduced and caused to react for 1 hour at 180° C. Thus, the core resin (b1) was obtained. One thousand parts by mass of the obtained core resin (b1) and 1000 parts by mass of acetone were introduced and stirred in a beaker, to thereby uniformly dissolve the core resin (b1) in acetone. Thus, the solution (Y1) for forming the core resin (b1) was obtained.

Manufacturing Example 5

Manufacturing of Solution (Y2) for Forming Core Resin (b2)

In a reaction vessel provided with a stirrer, a heating and cooling apparatus, and a thermometer, 937 parts by mass of polyester (Mn: 3500) obtained from sebacic acid, adipic acid, and ethylene glycol (a molar ratio of 0.8:0.2:1) and 300 parts by mass of acetone were introduced and stirred, to thereby uniformly dissolve polyester in acetone. In this solution, 27 parts by mass of isophoron diisocyanate (IPDI) were introduced and caused to react for 6 hours at 80° C. When an NCO value of a product obtained through reaction attained to 0, 28 parts by mass of trimellitic anhydride were introduced and caused to react for 1 hour at 180° C. Thus, a core resin (b2) was obtained. One thousand parts by mass of the obtained core resin (b2) and 1000 parts by mass of acetone were introduced and stirred in a beaker, to thereby uniformly dissolve the core resin (b2) in acetone. Thus, a solution (Y2) for forming the core resin (b2) was obtained.

Manufacturing Example 6

Manufacturing of Solution (Y3) for Forming Core Resin (b3)

In a reaction vessel provided with a stirrer, a heating and cooling apparatus, and a thermometer, 908 parts by mass of polyester (Mn: 2100) obtained from sebacic acid, adipic acid, and ethylene glycol (a molar ratio of 0.8:0.2:1) and 300 parts by mass of acetone were introduced and stirred, to thereby uniformly dissolve polyester in acetone. In this solution, 92 parts by mass of isophoron diisocyanate (IPDI) were introduced and caused to react for 6 hours at 80° C. When an NCO value of a product obtained through reaction attained to 0, 28 parts by mass of trimellitic anhydride were introduced and caused to react for 1 hour at 180° C. Thus, a core resin (b3) was obtained. One thousand parts by mass of the obtained core resin (b3) and 1000 parts by mass of acetone were introduced and stirred in a beaker, to thereby uniformly dissolve the core resin (b3) in acetone. Thus, a solution (Y3) for forming the core resin (b3) was obtained.

Manufacturing Example 7

Manufacturing of Solution (Y4) for Forming Core Resin (b4)

In a reaction vessel provided with a stirrer, a heating and cooling apparatus, and a thermometer, 986 parts by mass of polyester (Mn: 12000) obtained from sebacic acid, adipic acid, and ethylene glycol (a molar ratio of 0.8:0.2:1) and 300 parts by mass of acetone were introduced and stirred, to thereby uniformly dissolve polyester in acetone. In this solution, 14 parts by mass of isophoron diisocyanate (IPDI) were introduced and caused to react for 6 hours at 80° C. When an NCO value of a product obtained through reaction attained to 0, 28 parts by mass of trimellitic anhydride were introduced and caused to react for 1 hour at 180° C. Thus, a core resin (b4) was obtained. One thousand parts by mass of the obtained core resin (b4) and 1000 parts by mass of acetone were introduced and stirred in a beaker, to thereby uniformly dissolve the core resin (b4) in acetone. Thus, a solution (Y4) for forming the core resin (b4) was obtained.

Manufacturing Example 8

Manufacturing of Solution (Y5) for Forming Core Resin (b5)

In a reaction vessel provided with a stirrer, a heating and cooling apparatus, and a thermometer, 971 parts by mass of polyester (Mn: 4500) obtained from sebacic acid, adipic acid, and ethylene glycol (a molar ratio of 0.8:0.2:1) and 300 parts by mass of acetone were introduced and stirred, to thereby uniformly dissolve polyester in acetone. In this solution, 29 parts by mass of isophoron diisocyanate (IPDI) were introduced and caused to react for 6 hours at 80° C. When an NCO value of a product obtained through reaction attained to 0, 28 parts by mass of trimellitic anhydride were introduced and caused to react for 1 hour at 180° C. Thus, a core resin (b5) was obtained. One thousand parts by mass of the obtained core resin (b5) and 1000 parts by mass of acetone were introduced and stirred in a beaker, to thereby uniformly dissolve the core resin (b5) in acetone. Thus, a solution (Y5) for forming the core resin (b5) was obtained.

Manufacturing Example 9

Manufacturing of Solution (Y6) for Forming Core Resin (b6)

In a reaction vessel provided with a stirrer, a heating and cooling apparatus, and a thermometer, 875 parts by mass of polyester (Mn: 1500) obtained from sebacic acid, adipic acid, and ethylene glycol (a molar ratio of 0.8:0.2:1) and 300 parts by mass of acetone were introduced and stirred, to thereby uniformly dissolve polyester in acetone. In this solution, 125 parts by mass of isophoron diisocyanate (IPDI) were introduced and caused to react for 6 hours at 80° C. When an NCO value of a product obtained through reaction attained to 0, 28 parts by mass of trimellitic anhydride were introduced and caused to react for 1 hour at 180° C. Thus, a core resin (b6) was obtained. One thousand parts by mass of the obtained core resin (b6) and 1000 parts by mass of acetone were introduced and stirred in a beaker, to thereby uniformly dissolve the core resin (b6) in acetone. Thus, a solution (Y6) for forming the core resin (b6) was obtained.

Manufacturing Example 10

Manufacturing of Solution (Y7) for Forming Core Resin (b7)

In a reaction vessel provided with a stirrer, a heating and cooling apparatus, and a thermometer, 990 parts by mass of polyester (Mn: 15000) obtained from sebacic acid, adipic acid; and ethylene glycol (a molar ratio of 0.8:0.2:1) and 300 parts by mass of acetone were introduced and stirred, to thereby uniformly dissolve polyester in acetone. In this solution, 10 parts by mass of isophoron diisocyanate (IPDI) were introduced and caused to react for 6 hours at 80° C. When an NCO value of a product obtained through reaction attained to 0, 28 parts by mass of trimellitic anhydride were introduced and caused to react for 1 hour at 180° C. Thus, a core resin (b7) was obtained. One thousand parts by mass of the obtained core resin (b7) and 1000 parts by mass of acetone were introduced and stirred in a beaker, to thereby uniformly dissolve the core resin (b7) in acetone. Thus, a solution (Y7) for forming the core resin (b7) was obtained.

Manufacturing Example 11

Manufacturing of Solution (Y8) for Forming Core Resin (b8)

In a reaction vessel provided with a stirrer, a heating and cooling apparatus, and a thermometer, 920 parts by mass of polyester (Mn: 2000) obtained from sebacic acid, adipic acid, and ethylene glycol (a molar ratio of 0.8:0.2:1) and 300 parts by mass of acetone were introduced and stirred, to thereby uniformly dissolve polyester in acetone. In this solution, 80 parts by mass of isophoron diisocyanate (IPDI) were introduced and caused to react for 6 hours at 80° C. When an NCO value of a product obtained through reaction attained to 0, 28 parts by mass of trimellitic anhydride were introduced and caused to react for 1 hour at 180° C. Thus, a core resin (b8) was obtained. One thousand parts by mass of the obtained core resin (b8) and 1000 parts by mass of acetone were introduced and stirred in a beaker, to thereby uniformly dissolve the core resin (b8) in acetone. Thus, a solution (Y8) for forming the core resin (b8) was obtained.

Manufacturing Example 12

Manufacturing of Solution (Y9) for Forming Core Resin (b9)

In a reaction vessel provided with a stirrer, a heating and cooling apparatus, and a thermometer, 977 parts by mass of polyester (Mn: 8000) obtained from sebacic acid, adipic acid, and ethylene glycol (a molar ratio of 0.8:0.2:1) and 300 parts by mass of acetone were introduced and stirred, to thereby uniformly dissolve polyester in acetone. In this solution, 23 parts by mass of isophoron diisocyanate (IPDI) were introduced and caused to react for 6 hours at 80° C. When an NCO value of a product obtained through reaction attained to 0, 28 parts by mass of trimellitic anhydride were introduced and caused to react for 1 hour at 180° C. Thus, a core resin (b9) was obtained. One thousand parts by mass of the obtained core resin (b9) and 1000 parts by mass of acetone were introduced and stirred in a beaker, to thereby uniformly dissolve the core resin (b9) in acetone. Thus, a solution (Y9) for forming the core resin (b9) was obtained.

Manufacturing Example 13

Manufacturing of Solution (Y10) for Forming Core Resin (b10)

In a reaction vessel provided with a stirrer, a heating and cooling apparatus, and a thermometer, 925 parts by mass of polyester (Mn: 2000) obtained from sebacic acid, adipic acid, and ethylene glycol (a molar ratio of 0.8:0.2:1) and 300 parts by mass of acetone were introduced and stirred, to thereby uniformly dissolve polyester in acetone. In this solution, 75 parts by mass of isophoron diisocyanate (IPDI) were introduced and caused to react for 6 hours at 80° C. When an NCO value of a product obtained through reaction attained to 0, 28 parts by mass of trimellitic anhydride were introduced and caused to react for 1 hour at 180° C. Thus, a core resin (b10) was obtained. One thousand parts by mass of the obtained core resin (b10) and 1000 parts by mass of acetone were introduced and stirred in a beaker, to thereby uniformly dissolve the core resin (b10) in acetone. Thus, a solution (Y10) for forming the core resin (b10) was obtained.

Manufacturing Example 14

Manufacturing of Solution (Y11) for Forming Core Resin (b11)

In a reaction vessel provided with a stirrer, a heating and cooling apparatus, and a thermometer, 894 parts by mass of polyester (Mn: 1600) obtained from sebacic acid, adipic acid, and ethylene glycol (a molar ratio of 0.8:0.2:1) and 300 parts by mass of acetone were introduced and stirred, to thereby uniformly dissolve polyester in acetone. In this solution, 106 parts by mass of isophoron diisocyanate (IPDI) were introduced and caused to react for 6 hours at 80° C. When an NCO value of a product obtained through reaction attained to 0, 28 parts by mass of trimellitic anhydride were introduced and caused to react for 1 hour at 180° C. Thus, a core resin (b11) was obtained. One thousand parts by mass of the obtained core resin (b11) and 1000 parts by mass of acetone were introduced and stirred in a beaker, to thereby uniformly dissolve the core resin (b11) in acetone. Thus, a solution (Y11) for forming the core resin (b11) was obtained.

Manufacturing Example 15

Manufacturing of Solution (Y12) for Forming Core Resin (b12)

In a reaction vessel provided with a stirrer, a heating and cooling apparatus, and a thermometer, 870 parts by mass of polyester (Mn: 1300) obtained from sebacic acid, adipic acid, and ethylene glycol (a molar ratio of 0.8:0.2:1) and 300 parts by mass of acetone were introduced and stirred, to thereby uniformly dissolve polyester in acetone. In this solution, 130 parts by mass of isophoron diisocyanate (IPDI) were introduced and caused to react for 6 hours at 80° C. When an NCO value of a product obtained through reaction attained to 0, 28 parts by mass of trimellitic anhydride were introduced and caused to react for 1 hour at 180° C. Thus, a core resin (b12) was obtained. One thousand parts by mass of the obtained core resin (b12) and 1000 parts by mass of acetone were introduced and stirred in a beaker, to thereby uniformly dissolve the core resin (b12) in acetone. Thus, a solution (Y12) for forming the core resin (b12) was obtained.

Manufacturing Example 16

Manufacturing of Urethane Prepolymer

In a reaction vessel provided with a stirrer, a heating and cooling apparatus, a dehydrator, and a thermometer, 2000 parts by mass of polycaprolactone diol "Placcel L220AL" [manufactured by Daicel Chemical Industries, Ltd.] having a hydroxyl value of 56 were introduced and heated to 110° C., and dehydrated for 1 hour at a reduced pressure of 0.026 MPa. In the reaction vessel, 457 parts by mass of IPDI were introduced and caused to react for 10 hours at 110° C. Thus, a urethane prepolymer having an isocyanate group at an end was obtained. An NCO content of the urethane prepolymer (a mass of an NCO group in 1 mole of the urethane prepolymer/a molecular weight of the urethane prepolymer) was 3.6 mass %.

Manufacturing Example 17

Manufacturing of Curing Agent

In a reaction vessel provided with a stirrer, a heating and cooling apparatus, and a thermometer, 50 parts by mass of ethylene diamine and 300 parts by mass of methyl isobutyl ketone were introduced and caused to react for 5 hours at 50° C. Thus, a curing agent composed of a ketimine compound was obtained.

Manufacturing Example 18

Manufacturing of Dispersion Liquid of Coloring Agent

In a beaker, 25 parts by mass of copper phthalocyanine, 4 parts by mass of a dispersant for a coloring agent "Ajisper PB-821" (manufactured by Ajinomoto Fine-Techno Co., Inc.), and 75 parts by mass of acetone were introduced and stirred, to thereby uniformly disperse copper phthalocyanine. Thereafter, copper phthalocyanine was finely dispersed with the use of a bead mill. Thus, a dispersion liquid of a coloring agent was obtained. A laser particle size distribution analyzer ("LA-920" manufactured by Horiba, Ltd.) was used to measure a volume average particle size of the coloring agent (copper phthalocyanine) in the dispersion liquid of the coloring agent, which was 0.2 μm.

Example 1

Forty five parts by mass of the solution (Y1) for forming the core resin (b1) obtained in Manufacturing Example 4 above and 15 parts by mass of the dispersion liquid of the coloring agent obtained in Manufacturing Example 18 above were introduced in a beaker and stirred at 8000 rpm with the use of T.K. Auto Homo Mixer (manufactured by Tokushu Kika Kogyo Co., Ltd.) at 25° C. Thus, the resin solution (Y11) in which the coloring agent (copper phthalocyanine) was uniformly dispersed was obtained.

In another beaker, 67 parts by mass of liquid petrolatum and 6 parts by mass of the dispersion liquid (W1) of the shell particles (A1) were introduced to uniformly disperse the shell particles (A). Then, while T.K. Auto Homo Mixer was used at 25° C. to perform stirring at 10000 rpm, 60 parts by mass of the resin solution (Y11) were introduced and stirred for 2 minutes.

A liquid mixture thus obtained was introduced in a reaction vessel provided with a stirrer, a heating and cooling apparatus, a thermometer, and a desolventizer, and a temperature was raised to 35° C. Thereafter, at a reduced pressure of 0.039 MPa at 35° C., acetone was distilled out until a concentration of acetone in the liquid mixture above was not higher than 0.5 mass %. Thus, a liquid developer (X-1) was obtained.

A concentration of acetone in the liquid developer (X-1) was quantified with the use of gas chromatography "GC2010" [FID type, manufactured by Shimadzu Corporation]. Solubility (25° C.) of the shell resin (a) in the insulating liquid (L) in the liquid developer (X-1) was measured in accordance with a method shown below, which was 3 mass %.

Ten grams of the liquid developer (X-1) were centrifuged for 30 minutes at 10000 rpm at 25° C. and a whole amount of a supernatant was collected. Ten milliliters of the insulating liquid (L) were added to a solid content which remained without being collected, and the solid content was dispersed again. This solution was centrifuged for 30 minutes at 10000 rpm at 25° C. and a whole amount of a supernatant was collected. This operation was further repeated and the supernatant was collected three times in total. A reduced-pressure dryer was used to dry the whole collected supernatant for 1 hour at a reduced pressure of 20 mmHg at a temperature as high as a boiling point of the insulating liquid (L). Thereafter, a mass of the residue was weighed. A mass Y (g) of the residue at this time and a mass y (g) of the shell resin (a) in 10 g of the liquid developer (X-1) are substituted in an equation below, so that solubility of the shell resin (a) in the insulating liquid (L) at 25° C. can be found. Here, mass y (g) of the shell resin (a) in 10 g of the liquid developer (X-1) is a value found from the mass of the shell resin (a) added during manufacturing of the liquid developer (X).

[Solubility of shell resin (a) in insulating liquid (L) at 25° C.]=$(Y/y) \times 100$ Examples 2 to 8

Comparative Examples 1 to 6

Liquid developers (X-2) to (X-8) in Examples 2 to 8 and liquid developers (X-11) to (X-16) in Comparative Examples 1 to 6 were obtained as in Example 1 above, except that a solution for forming a core resin, a urethane prepolymer, a curing agent, a dispersion liquid of a coloring agent, liquid petrolatum, and a dispersion liquid of shell particles shown in Tables 1 to 2 were used.

[Relation Between Mn of Core Resin (b) and Urethane Group Concentration in Core Resin (b)]

With regard to the core resins (b) obtained in Manufacturing Examples 4 to 15 above, Mn of the core resin (b) was measured in accordance with the method shown in <Method of Measuring Mn> below, and a urethane group concentration in the core resin (b) was measured in accordance with the method shown in <Method of Measuring Urethane Group Concentration> below.

<Method of Measuring Mn>

Measurement was conducted with GPC under conditions below.

Measurement Apparatus: "HLC-8220GPC" manufactured by Tosoh Corporation

Column: Shodex KF-404HQ and Shodex KF-402HQ (each manufactured by Showa Denko K.K.)

Sample Solution: 0.25 mass % of THF solution

Amount of Injection of THF Solution into Column: 100 μl

Flow Rate: 0.3 ml/min.

Detection Apparatus: RI (refraction index) detector

Calibration Curve Standard polystyrene

<Method of Measuring Urethane Group Concentration>

Measurement was conducted with GCMS. Specifically, the core resin (b) was pyrolyzed under conditions shown below, and then a urethane group concentration in the core resin (b) was measured with GCMS under conditions below. Specifically, a urethane group concentration in the core resin (b) was calculated by using a ratio of ionic strength detected from the pyrolyzed core resin (b).

A urethane group concentration in the core resin (b) was measured under conditions shown below.

Apparatus: "QP2010" manufactured by Shimadzu Corporation

Column: "UltraALLOY-5" manufactured by Frontier Laboratories Ltd. (inner diameter: 0.25 mm, length: 30 m, thickness: 0.25 μm)

Temperature Increase Condition: Temperature Increase Range: 100° C. to 320° C. (held at 320° C.), Rate of Temperature Increase: 20° C./min.

Pyrolysis of the core resin (b) at the time of measurement of a urethane group concentration in the core resin (b) was carried out under conditions shown below.

Figure 2:
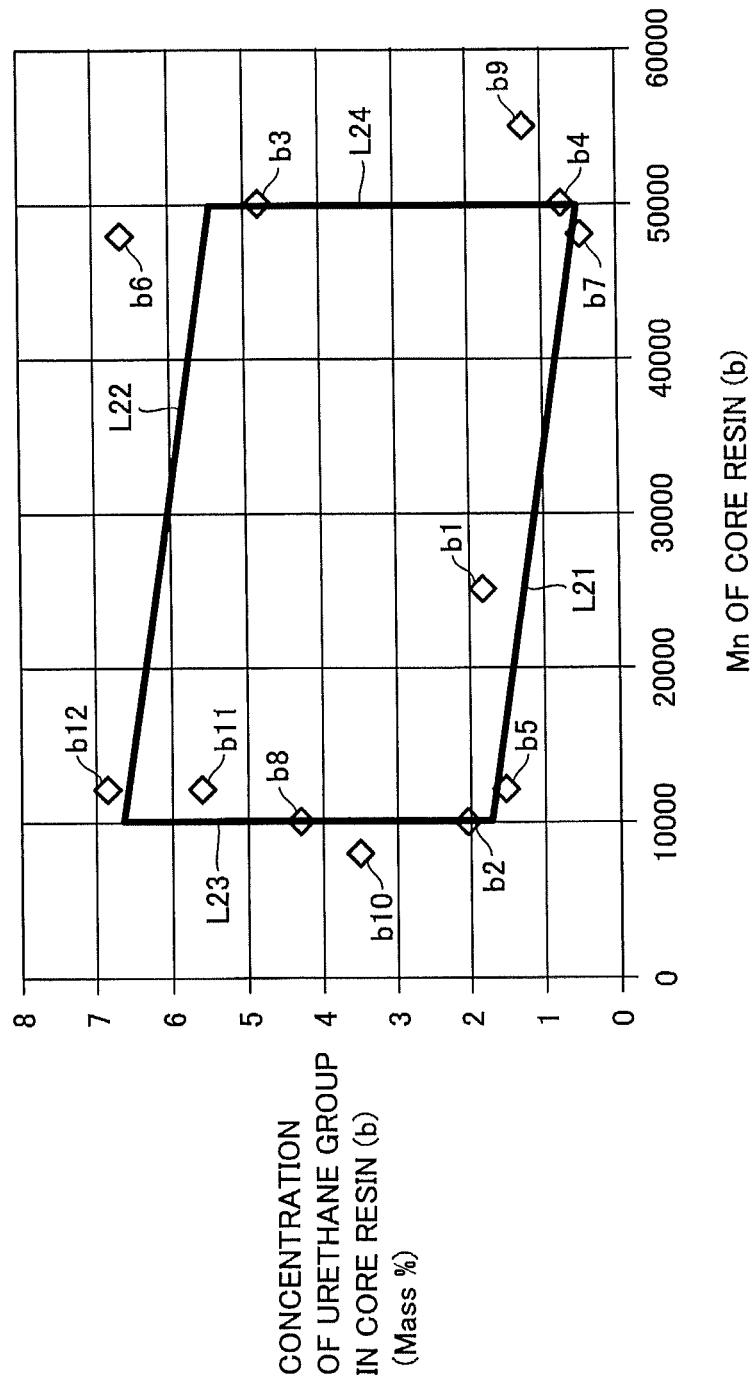
FIG. 2 is a graph showing results in Examples and Comparative Examples.

Apparatus: "PY-2020iD" manufactured by Frontier Laboratories Ltd.
  Mass of Sample: 0.1 mg
  Heating Temperature: 550° C.
  Heating Time Period: 0.5 minute Tables 1 to 2 and FIG. 2 show measured Mn of the core resin (b) and the urethane group concentration in the core resin (b). FIG. 2 is a graph showing relation between Mn of the core resin (b) and the urethane group concentration in the core resin (b). L21 to L24 in FIG. 2 will be described later.

[Measurement of Volume Average Particle Size of Toner Particles (C)]

The liquid developers (X-1) to (X-8) in Examples 1 to 8 and the liquid developers (X-11) to (X-16) in Comparative Examples 1 to 6 were diluted with liquid petrolatum. A laser particle size distribution analyzer ("LA-920" manufactured by Horiba, Ltd.) was used to measure particle size distribution of the toner particles (C) in the diluted solution. Tables 1 to 2 show results in "Volume Average Particle Size of Toner Particles (μm)."

[Evaluation of State of Shell Particles (A) in Toner Particles (C)]

A scanning electron microscope (SEM, "S-4800" manufactured by Hitachi High-Tech Manufacturing & Service Corporation) was used to observe the surfaces of the toner particles (C) and whether or not the shell particles (A) were attached to or covered the surfaces of the core particles (B) was determined. Tables 1 to 2 show results in "State of Shell Particles in Toner Particles."

[Measurement of Ratio of Surface Coverage of Core Particles (B) with Shell Particles (A) in Toner Particles (C)]

An image obtained by the scanning electron microscope (SEM) was analyzed and Equation (7) above was used to find a ratio of surface coverage of the core particles (B) with the shell particles (A) in the toner particles (C). Tables 1 to 2 show results in "Surface Coverage Ratio of Core Particles (%)."

[Evaluation of Fixability]

An image formation apparatus shown in FIG. 1 was used to form a solid fill pattern (10 cm×10 cm, attached amount: 2 mg/m$^2$) of the liquid developers (X-1) to (X-8) in Examples 1 to 8 and the liquid developers (X-11) to (X-16) in Comparative Examples 1 to 6 on coated paper which represents recording paper (trade name: "OK top coat+", manufactured by Oji Paper Co., Ltd., 128 g/cm$^2$). With fixation with a heat roller (temperature: 180° C., nipping time period: 30 msec.), a sample in which a solid fill pattern image was formed on coated paper was obtained. Two samples were fabricated for each of Examples and Comparative Examples.

Thereafter, solid fill pattern images were rubbed twice with an eraser (trade name: ink eraser "LION 26111", manufactured by Lion Office Products, Corp.) at pressing load of 1 kgf and a ratio of remaining image density was measured with a reflection density meter (trade name: "X-Rite model 404", manufactured by X-Rite, Incorporated.). As the ratio of remaining image density is higher, fixation strength of an image is high, which indicates that toner particles are excellent in fixability.

Process conditions and outlines of the process for the image formation apparatus used above are as follows.

<Process Conditions>
System Speed: 40 cm/s
Photoconductor: Negatively charged OPC
Charge Potential: −700 V
Development Voltage (Voltage Applied to Development Roller): −450 V
Transfer Voltage (Voltage Applied to Transfer Roller): +600 V
Pre-Development Corona CHG: Adjusted as appropriate between −3 and 5 kV of needle application voltage <Outlines of Process>

FIG. 1 is a schematic conceptual diagram of an image formation apparatus 1 of an electrophotography type. Initially, a liquid developer 2 is taken by a supply roller 3 and leveled off by a restriction blade 4, so that a thin layer of a liquid developer having a prescribed thickness is formed on supply roller 3 (in a case of an anilox roller, a groove in the roller is filled with the liquid developer and a defined amount is measured by the restriction roller).

Then, the thin layer of the liquid developer moves from supply roller 3 to a development roller 5 and toner particles move onto a photoconductor 6 as a result of nipping between development roller 5 and photoconductor 6, so that a toner image is formed on photoconductor 6. Thereafter, the toner image is transferred onto a recording material 11 as a result of nipping between photoconductor 6 and a back-up roller 10 and that image is fixed by heat rollers 12. Image formation apparatus 1 also includes a cleaning blade 7, a cleaning blade 8, and a charging apparatus 9, in addition to the above.

Tables 1 to 2 show results. Tables 1 to 2 show "A1" when a ratio of remaining image density was 90% or higher, show "B1" when a ratio of remaining image density was not lower than 80% and lower than 90%, and show "C1" when a ratio of remaining image density was lower than 80%.

TABLE 1

| | | Examples | | | | | | | |
|---|---|---|---|---|---|---|---|---|---|
| | | 1 (X-1) | 2 (X-2) | 3 (X-3) | 4 (X-4) | 5 (X-5) | 6 (X-6) | 7 (X-7) | 8 (X-8) |
| Solution for Forming Core Resin | Type | Y1 | Y1 | Y2 | Y3 | Y4 | Y1 | Y8 | Y11 |
| | Content (Parts by Mass) | 45 | 45 | 45 | 45 | 45 | 40 | 45 | 45 |
| Core Resin | Type | b1 | b1 | b2 | b3 | b4 | b1 | b8 | b11 |
| | Mn | 25000 | 25000 | 10000 | 50000 | 50000 | 25000 | 10000 | 12000 |
| | Urethane Group Concentration (Mass %) | 1.81 | 1.81 | 2.06 | 4.87 | 0.73 | 1.81 | 4.25 | 5.61 |

TABLE 1-continued

| | | Examples | | | | | | | |
|---|---|---|---|---|---|---|---|---|---|
| | | 1 (X-1) | 2 (X-2) | 3 (X-3) | 4 (X-4) | 5 (X-5) | 6 (X-6) | 7 (X-7) | 8 (X-8) |
| Urethane Prepolymer | Content (Parts by Mass) | — | — | — | — | — | 2.5 | — | — |
| Curing Agent | Content (Parts by Mass) | — | — | — | — | — | 0.1 | — | — |
| Dispersion Liquid of Coloring Agent | Content (Parts by Mass) | 15 | 15 | 15 | 15 | 15 | 15 | 15 | 15 |
| Liquid Petrolatum | Content (Parts by Mass) | 67 | 67 | 67 | 67 | 67 | 67 | 67 | 67 |
| Dispersion Liquid of Shell Particles | Type | W1 | W2 | W1 | W1 | W1 | W1 | W2 | W1 |
| | Content (Parts by Mass) | 6 | 6 | 6 | 6 | 6 | 6 | 6 | 6 |
| Solubility of Shell Resin (Mass %) | | 3 | 3 | 3 | 1 | 1 | 3 | 3 | 3 |
| Volume Average Particle Size of Toner Particles (μm) | | 1.2 | 1.3 | 1.2 | 1.3 | 1.3 | 1.6 | 1.8 | 1.2 |
| State of Shell Particles in Toner Particles | | Covered | Covered | Covered | Covered | Covered | Covered | Covered | Covered |
| Surface Coverage Ratio of Core Particles (%) | | 85 | 90 | 90 | 85 | 85 | 90 | 80 | 85 |
| Fixability | | A1 | A1 | A1 | B1 | B1 | A1 | A1 | A1 |
| Hot Offset Tendency | | A2 | A2 | B2 | A2 | B2 | A2 | B2 | B2 |

TABLE 2

| | | Comparative Example | | | | | |
|---|---|---|---|---|---|---|---|
| | | 1 (X-11) | 2 (X-12) | 3 (X-13) | 4 (X-14) | 5 (X-15) | 6 (X-16) |
| Solution for Forming Core Resin | Type | Y5 | Y6 | Y7 | Y9 | Y10 | Y12 |
| | Content (Parts by Mass) | 45 | 45 | 45 | 45 | 45 | 45 |
| Core Resin | Type | b5 | b6 | b7 | b9 | b10 | b12 |
| | Mn | 12000 | 48000 | 48000 | 55000 | 8000 | 12000 |
| | Urethane Group Concentration (Mass %) | 1.56 | 6.64 | 0.53 | 1.23 | 3.48 | 6.91 |
| Urethane Prepolymer | Content (Parts by Mass) | — | — | — | — | — | — |
| Curing Agent | Content (Parts by Mass) | — | — | — | — | — | — |
| Dispersion Liquid of Coloring Agent | Content (Parts by Mass) | 15 | 15 | 15 | 15 | 15 | 15 |
| Liquid Petrolatum | Content (Parts by Mass) | 67 | 67 | 67 | 67 | 67 | 67 |
| Dispersion Liquid of Shell Particles | Type | W1 | W1 | W1 | W1 | W1 | W1 |
| | Content (Parts by Mass) | 6 | 6 | 6 | 6 | 6 | 6 |
| Solubility of Shell Resin (Mass %) | | 3 | 3 | 3 | 3 | 3 | 3 |
| Volume Average Particle Size of Toner Particles (μm) | | 1.2 | 2.2 | 2.4 | 7.4 | 9.0 | 2.7 |
| State of Shell Particles in Toner Particles | | Covered | Covered | Covered | Covered | Covered | Covered |
| Surface Coverage Ratio of Core Particles (%) | | 90 | 85 | 85 | 85 | 85 | 85 |
| Fixability | | A1 | C1 | A1 | C1 | A1 | C1 |
| Hot Offset Tendency | | C2 | A2 | C2 | A2 | C2 | A2 |

[Evaluation of Hot Offset Tendency]

After the sample above in [Evaluation of Fixability] was fabricated, blank paper was passed through the image formation apparatus shown in FIG. 1. Whether or not toner contamination was attached to blank paper was visually inspected.

Tables 1 to 2 show results. Tables 1 to 2 show "A2" when no toner contamination was attached to blank paper (that is, no hot offset occurred), show "B2" when toner contamination was lightly attached to blank paper, and show "C2" when toner contamination was attached to blank paper (that is, hot offset occurred).

<Discussion>

As shown in Table 1, in Examples 1 to 8, image density was high and fixability of toner particles was excellent. In addition, occurrence of hot offset was prevented. The reason for this may be because the core resins (b) (the core resins (b1) to (b4), (b8)) in Examples 1 to 8 have prescribed viscoelasticity.

Specifically, as can be seen in FIG. 2, Mn of the core resin (b) in Comparative Example 5 (the core resin (b10)) is smaller than Mn of the core resin (b) in Example 7 (the core resin (b8)). Therefore, it is considered that melt viscosity of the core resin (b) was too low in Comparative Example 5, and hence elasticity of the core resin could not be maintained in a high-temperature region and thus hot offset occurred. Thus, it can be concluded that Mn of the core resin (b) is preferably on the right of L23 shown in FIG. 2.

As can be seen in FIG. 2, Mn of the core resin (b) in Comparative Example 4 (the core resin (b9)) is greater than Mn of the core resins (b) in Examples 4 to 5 (the core resins (b3) to (b4)). Therefore, it is considered that melt viscosity of the core resin (b) was too high in Comparative Example 4 and hence fixability of the toner particles lowered. Thus, it can be concluded that Mn of the core resin (b) is preferably on the left of L24 shown in FIG. 2.

On the other hand, in Comparative Example 1, despite the fact that Mn of the core resin (b) (the core resin (b5)) is located between L23 and L24 shown in FIG. 2, hot offset occurred. The reason for this may be as shown below. When Comparative Example 1 and Example 3 are compared with each other, Mn of the core resin (b) is each located between L23 and L24 shown in FIG. 2, however, the urethane group concentration in the core resin (b) in Comparative Example 1 (the core resin (b5)) is lower than the urethane group concentration in the core resin (b) in Example 3 (the core resin (b2)). Therefore, it is considered that, since melt viscosity of the core resin (b)

was too low in Comparative Example 1, elasticity of the core resin in a high-temperature region could not be maintained and thus hot offset occurred.

In Comparative Example 3, despite the fact that Mn of the core resin (b) (the core resin (b7)) is located between L23 and L24 shown in FIG. 2, hot offset occurred. The reason for this may be as shown below. When Comparative Example 3 and Example 5 are compared with each other, Mn of the core resin (b) is each located between L23 and L24 shown in FIG. 2, however, the urethane group concentration in the core resin (b) in Comparative Example 3 (the core resin (b7)) is lower than the urethane group concentration in the core resin (b) in Example 5 (the core resin (b4)). Therefore, it is considered that, in Comparative Example 3, elasticity of the core resin in a high-temperature region could not be maintained and thus hot offset occurred.

In Comparative Example 6, despite the fact that Mn of the core resin (b) (the core resin (b12)) is located between L23 and L24 shown in FIG. 2, fixability lowered. The reason for this may be as shown below. When Comparative Example 6 and Example 8 are compared with each other, Mn of the core resin (b) is each located between L23 and L24 shown in FIG. 2, however, the urethane group concentration in the core resin (b) in Comparative Example 6 (the core resin (b12)) is higher than the urethane group concentration in the core resin (b) in Example 8 (the core resin (b11)). Therefore, it is considered that, in Comparative Example 6, elasticity of the core resin (b) was too high and hence fixability of the toner particles (C) lowered.

In Comparative Example 2, despite the fact that Mn of the core resin (b) (the core resin (b6)) is located between L23 and L24 shown in FIG. 2, fixability lowered. When Comparative Example 2 and Example 4 are compared with each other, Mn of the core resin (b) is each located between L23 and L24 shown in FIG. 2, however, the urethane group concentration in the core resin (b) in Comparative Example 2 (the core resin (b6)) is higher than the urethane group concentration in the core resin (b) in Example 4 (the core resin (b3)). Therefore, it is considered that, in Comparative Example 2, melt viscosity of the core resin (b) was too high and hence fixability of the toner particles lowered.

Furthermore, as can be seen in FIG. 2, in Examples 1, 2, and 6, Mn of the core resin (b) (the core resin (b1)) is greater than that in Comparative Example 5 and smaller than that in Comparative Example 4, and the urethane group concentration in the core resin (b) (the core resin (b1)) is higher than that in Comparative Examples 1 and 3 and lower than that in Comparative Examples 2 and 6. Thus, it can be concluded that, if Mn of the core resin (b) and a urethane group concentration are within a region surrounded by L21 to L24 shown in FIG. 2, viscoelasticity of the core resin can be optimized. L21 is a straight line in a case where an inequality sign on the left in Equation (1) above is an equal sign and L22 is a straight line in a case where an inequality sign on the right in Equation (1) above is an equal sign. L23 is a straight line in a case where an inequality sign on the left in Equation (2) above is an equal sign and L24 is a straight line in a case where an inequality sign on the right in Equation (2) above is an equal sign. From the foregoing, image density can be maintained high by using a resin satisfying Equations (1) to (2) above as the core resin (b). Therefore, it is considered that fixability of toner particles is improved and occurrence of hot offset is also prevented.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A liquid developer comprising an insulating liquid and toner particles dispersed in said insulating liquid, wherein
said toner particles have a core-shell structure that first resin particles containing a first resin are attached to or cover surfaces of second resin particles containing a second resin,
said second resin satisfies $$-0.00003x+2.03 \leq y \leq -0.00003x+6.95 \quad \text{Equation (1)}$$

$$10000 \leq x \leq 50000 \quad \text{Equation (2)}$$

where x represents a number average molecular weight of said second resin and y represents a urethane group concentration (mass %) in said second resin,
wherein said first resin particles are discrete and independent from said second resin particles.

2. The liquid developer according to claim 1, wherein
said toner particles have a volume average particle size not smaller than 0.01 μm and not greater than 100 μm, and
said toner particles have a coefficient of variation of volume distribution not lower than 1% and not higher than 100%.

3. The liquid developer according to claim 1, wherein
said toner particles have an average value of circularity not smaller than 0.92 and not greater than 1.0.

4. The liquid developer according to claim 1, wherein
said first resin is at least one of a vinyl resin, a polyester resin, a polyurethane resin, and an epoxy resin.

5. The liquid developer according to claim 1, wherein
said first resin is a vinyl resin, which is a homopolymer or a copolymer containing a bonding unit derived from a vinyl monomer.

6. The liquid developer according to claim 5, wherein
said vinyl monomer is a vinyl monomer having a first molecular chain.

7. The liquid developer according to claim 6, wherein
said vinyl monomer is at least one of a vinyl monomer having a straight-chain hydrocarbon chain having a carbon number from 12 to 27, a vinyl monomer having a branched hydrocarbon chain having a carbon number from 12 to 27, a vinyl monomer having a fluoro-alkyl chain having a carbon number from 4 to 20, and a vinyl monomer having a polydimethylsiloxane chain.

8. The liquid developer according to claim 1, wherein
said second resin particles contain at least one of a wax and a modified wax obtained by graft polymerization of a vinyl monomer with said wax.

9. The liquid developer according to claim 1, wherein
in said toner particles, a ratio of surface coverage of said second resin particles with said first resin particles is not lower than 50%.

10. The liquid developer according to claim 1, being a paint, a liquid developer for electrophotography, a liquid developer for electrostatic recording, an oil-based ink for ink jet printer, or an ink for electronic paper.

11. The liquid developer according to claim 1, wherein
said second resin particles contain said second resin and a coloring agent.

12. The liquid developer according to claim 1, wherein said first resin particles are adsorbed to the surface of said second resin particles.

13. A method for manufacturing a liquid developer, comprising the steps of:
preparing a dispersion liquid of first resin particles in which first resin particles containing a first resin are dispersed in an insulating liquid;

preparing a solution for forming a second resin, which is obtained by dissolving the second resin or a precursor of the second resin in a first organic solvent; and obtaining toner particles having a core-shell structure that said first resin particles are attached to or cover surfaces of second resin particles containing said second resin, by dispersing said solution for forming a second resin in the dispersion liquid of said first resin particles, said second resin satisfying $$-0.00003x+2.03 \leq y \leq -0.00003x+6.95 \qquad \text{Equation (1)}$$

$$10000 \leq x \leq 50000 \qquad \text{Equation (2)}$$

where x represents a number average molecular weight of said second resin and y represents a urethane group concentration (mass %) in said second resin, wherein said first resin particles are discrete and independent from said second resin particles.

14. The method for manufacturing a liquid developer according to claim 13, wherein
said first organic solvent is distilled out after said step of obtaining toner particles.

15. The method for manufacturing a liquid developer according to claim 13, wherein
said first organic solvent has a solubility parameter from 8.5 to 20 $(\text{cal/cm}^3)^{1/2}$.

16. The method for manufacturing a liquid developer according to claim 13, wherein
said first resin is at least one of a vinyl resin, a polyester resin, a polyurethane resin, and an epoxy resin.

17. The method for manufacturing a liquid developer according to claim 13, wherein
said first resin is a vinyl resin, which is a homopolymer or a copolymer containing a bonding unit derived from a vinyl monomer.

18. The method for manufacturing a liquid developer according to claim 17, wherein
said vinyl monomer is a vinyl monomer having a first molecular chain.

19. The method for manufacturing a liquid developer according to claim 18, wherein
said vinyl monomer is at least one of a vinyl monomer having a straight-chain hydrocarbon chain having a carbon number from 12 to 27, a vinyl monomer having a branched hydrocarbon chain having a carbon number from 12 to 27, a vinyl monomer having a fluoro-alkyl chain having a carbon number from 4 to 20, and a vinyl monomer having a polydimethylsiloxane chain.

20. The method for manufacturing a liquid developer according to claim 13, wherein
said second resin particles contain at least one of a wax and a modified wax obtained by graft polymerization of a vinyl monomer with said wax.

* * * * *